United States Patent
Zhang

(10) Patent No.: US 11,277,821 B2
(45) Date of Patent: Mar. 15, 2022

(54) RESOURCE CONFLICT REDUCING METHOD AND UE

(71) Applicant: Huawei Technologies Co., Ltd., Shenzhen (CN)

(72) Inventor: Xingwei Zhang, Lund (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/690,651

(22) Filed: Nov. 21, 2019

(65) Prior Publication Data

US 2020/0092852 A1     Mar. 19, 2020

Related U.S. Application Data

(63) Continuation of application No. 15/894,332, filed on Feb. 12, 2018, now Pat. No. 10,536,928, which is a continuation of application No. PCT/CN2015/087067, filed on Aug. 14, 2015.

(51) Int. Cl.
*H04W 72/04* (2009.01)
*H04W 72/02* (2009.01)
*H04W 74/08* (2009.01)

(52) U.S. Cl.
CPC ........... *H04W 72/04* (2013.01); *H04W 72/02* (2013.01); *H04W 74/085* (2013.01); *H04W 74/0808* (2013.01)

(58) Field of Classification Search
None
See application file for complete search history.

(56) References Cited

U.S. PATENT DOCUMENTS

| 8,406,331 | B2 |   | 3/2013 | Orfanos et al. |
| 8,588,803 | B2 |   | 11/2013 | Hakola et al. |
| 8,660,071 | B2 | * | 2/2014 | Borran ............... H04W 16/10 370/329 |
| 9,661,621 | B2 | * | 5/2017 | Park .................... H04W 72/042 |
| 9,693,348 | B2 |   | 6/2017 | Zhang et al. |

(Continued)

FOREIGN PATENT DOCUMENTS

| CN | 1973492 A | 5/2007 |
| CN | 103517276 A | 1/2014 |

(Continued)

OTHER PUBLICATIONS

"WF on Pools Configuration," Ericsson, Qualcomm, R1-143455, Aug. 27, 2014, 6 pages.

(Continued)

*Primary Examiner* — Tri H Phan
(74) *Attorney, Agent, or Firm* — Slater Matsil, LLP

(57) ABSTRACT

A resource conflict reducing method, including determining, by a first user equipment (UE), N available resources from S resources detected at the UE, where S is a quantity of resources that are indicated by resource configuration information obtained by the first UE, and where S is an integer greater than or equal to 1, determining, by the first UE, M resources according to the N available resources, and sending, by the first UE, data to at least one second UE by using the M resources, where N is an integer greater than or equal to 0 and less than or equal to S, and wherein M is an integer greater than or equal to 0 and less than or equal to N.

18 Claims, 7 Drawing Sheets

(56) References Cited

U.S. PATENT DOCUMENTS

| | | | |
|---|---|---|---|
| 9,769,644 B2* | 9/2017 | He | H04L 5/0028 |
| 9,794,950 B2* | 10/2017 | Ryu | H04W 72/085 |
| 9,907,056 B2 | 2/2018 | Bagheri et al. | |
| 10,051,667 B2 | 8/2018 | Jung et al. | |
| 10,091,828 B2 | 10/2018 | Lee et al. | |
| 10,206,215 B2 | 2/2019 | Kim et al. | |
| 10,412,754 B2* | 9/2019 | Khoryaev | H04W 72/1284 |
| 10,477,519 B2* | 11/2019 | Zhao | H04W 64/00 |
| 10,536,928 B2* | 1/2020 | Zhang | H04W 72/02 |
| 2008/0273606 A1 | 11/2008 | Orfanos et al. | |
| 2011/0312331 A1 | 12/2011 | Hakola et al. | |
| 2012/0269156 A1 | 10/2012 | Quan et al. | |
| 2014/0094183 A1 | 4/2014 | Gao et al. | |
| 2015/0036616 A1 | 2/2015 | Lee et al. | |
| 2015/0110056 A1 | 4/2015 | Wang et al. | |
| 2018/0206260 A1 | 7/2018 | Khoryaev et al. | |
| 2018/0279395 A1 | 9/2018 | Nagata et al. | |
| 2019/0007989 A1 | 1/2019 | Lee et al. | |
| 2019/0037535 A1 | 1/2019 | Sun et al. | |

FOREIGN PATENT DOCUMENTS

| | | |
|---|---|---|
| CN | 103945538 A | 7/2014 |
| CN | 104144501 A | 11/2014 |
| CN | 104519577 A | 4/2015 |
| JP | 2015012591 A | 1/2015 |
| KR | 20140142693 A | 12/2014 |
| WO | 2006000955 A1 | 1/2006 |
| WO | 2006115864 A2 | 11/2006 |
| WO | 2011079814 A1 | 7/2011 |
| WO | 2015069040 A1 | 5/2015 |

OTHER PUBLICATIONS

"SA Resource Allocation," Source: Ericsson, Agenda Item: 7.2.1.2.2, Document for: Discussion and Decision, 3GPP TSG-RAN WG1 Meeting #78bis, R1-144326, Ljubljana, Slovenia, Oct. 6-10, 2014, 4 pages.

"3rd Generation Partnership Project;Technical Specification Group Radio Access Network; Evolved Universal Terrestrial Radio Access (E-UTRA); Physical Layer Procedures (Release 12)," 3GPP TS 36.213 V12.6.0, Technical Specification, Jun. 2015, 241 pages.

"3rd Generation Partnership Project;Technical Specification Group Radio Access Network; Evolved Universal Terrestrial Radio Access (E-UTRA); Medium Access Control (MAC) Protocol Specification (Release 12)," 3GPP TS 36.321 V12.6.0, Technical Specification, Jun. 2015, 77 pages.

"3rd Generation Partnership Project; Technical Specification Group Radio Access Network; Evolved Universal Terrestrial Radio Access (E-UTRA); Radio Resource Control (RRC); Protocol Specification (Release 12)," 3GPP TS 36.331 V12.6.0, Technical Specification, Jun. 2015, 449 pages.

"Distributed Resource Allocation from Mode-2," Agenda Item: 6.2.5.2.1, Source: Huawei, HiSilicon, Document for: Discussion and Decision, 3GPP TSG RAN WG1 Meeting #77, R1-141929, Seoul, Korea, May 19-23, 2014, 5 pages.

"Mode 2 Resource Allocation for D2D," Agenda Item: 7.2.3.2.1, Source: Huawei, HiSilicon, Document for: Discussion and Decision, 3GPP TSG RAN WG1 Meeting #78, Dresden, R1-142839, Germany, Aug. 18-22, 2014, 7 pages.

Von, V. et al., "Development and Performance Evaluation of an Adaptive MAC Protocol for MC-CDMA Wireless LANs with QoS Support," XP-002761509, Internet Citation, Jul. 1, 2006, 34 pages.

Huawei, HiSilicon et al., "Mode 2 resource allocation for D2D", 3GPP TSG RAN WG1 Meeting #78, R1-142839, Aug. 18-22, 2014, 6 pages, Dresden, Germany.

Huawei, HiSilicon et al., "Distributed resource allocation from mode-2", 3GPP TSG RAN WG1 Meeting #77, R1-141929, May 19-23, 2014, 4 pages, Seoul, Korea.

* cited by examiner

RESOURCE CONFLICT REDUCING METHOD AND UE

CROSS-REFERENCE TO RELATED APPLICATIONS

This application is a continuation of U.S. patent application Ser. No. 15/894,332, filed on Feb. 12, 2018, which is a continuation of International Application No. PCT/CN2015/087067, filed on Aug. 14, 2015. Each of the afore-mentioned patent applications are hereby incorporated by reference in their entireties.

TECHNICAL FIELD

The present invention relates to the communications field, and in particular, to a resource conflict reducing method and user equipment (UE).

BACKGROUND

With rapid development of wireless communication, an ultra-high-rate service, for example, high-definition video, has been derived. The ultra-high-rate service makes load of a wireless communications network become increasingly heavy. How to reduce network load becomes a research hotspot. A device to device (D2D) technology emerges. In such a device direct-connection communication mode, direct communication may be performed between terminals, and no base station is required for forwarding, thereby reducing data load of a base station. In D2D communication, a spectrum resource can be utilized better, spectrum utilization and a data rate can be increased, and load of the base station can be reduced.

In the D2D technology, considering that the base station has relatively strong interference immunity, an uplink spectrum resource of an Long Term Evolution-Advanced (LTE-A) system is multiplexed. Currently, there are two resource allocation modes in D2D device communication. One is a manner based on base station scheduling, and the other is a contention-based manner, that is, UE that needs to send data or signaling obtains, from a resource pool in a contention manner, a time-frequency resource for sending the data or signaling.

In an existing resource allocation mechanism based on the contention manner, the UE randomly selects some resources from the resource pool (that is, resources that are configured by the base station or preconfigured and that are used for D2D), and then sends a discovery signal on the randomly selected resources based on a probability P that is configured by the base station or preconfigured. For example, UE1 randomly selects, from the resource pool, two PRBs (Physical Resource Block), and a probability P preconfigured by the base station is 0.5. In this case, the UE1 sends a discovery signal on the two PRBs according to the probability of 50%. From a perspective of a statistical probability, the discovery signal is actually sent once in every two sending opportunities.

The data (or signaling) is sent based on the probability preconfigured by the base station. It is most likely that the finally selected resources are still occupied and a conflict is still generated. Consequently, a conflict generated in the D2D technology because transmit UE (that is, UE that needs to send data) preempts a resource cannot be effectively reduced.

SUMMARY

Embodiments of the present invention provide a resource conflict reducing method and UE, so as to effectively reduce a conflict generated in a D2D technology because transmit UE preempts a resource.

To achieve the foregoing objective, the following technical solutions are used in the embodiments of the present invention.

According to a first aspect, a resource conflict reducing method is disclosed, including determining, by first UE, N available resources from S resources, where S is a resource quantity indicated by resource configuration information obtained by the first UE, determining, by the first UE, M resources according to the N available resources, and sending, by the first UE, data to at least one second UE by using the M resources, where S is an integer greater than or equal to 1, N is an integer greater than or equal to 0 and less than or equal to S, and M is an integer greater than or equal to 0 and less than or equal to N.

With reference to the first aspect, in a first possible implementation of the first aspect, the determining, by the first UE, M resources according to the N available resources includes randomly selecting, by the first UE, the M resources from the N available resources.

With reference to the first aspect, in a second possible implementation of the first aspect, before the determining, by first UE, N available resources from S resources, the method further includes obtaining, by the first UE, the resource configuration information, where the resource configuration information includes information about the S resources, and the resource configuration information is configured by a base station or preconfigured.

With reference to the first aspect, in a third possible implementation of the first aspect, the determining, by first UE, N available resources from S resources includes detecting, by the first UE, energy or power of a signal carried on each of the S resources, and if the energy of the signal carried on the resource is less than a threshold m or the power of the signal carried on the resource is less than a threshold n, determining that the resource is the available resource, where m and n are positive numbers, or detecting, by the first UE, a sequence carried on each of the S resources, and if the resource carries no preset sequence, determining that the resource is the available resource.

With reference to the first aspect, in a fourth possible implementation of the first aspect, after the determining, by first UE, N available resources from S resources, the method further includes determining, by the first UE, the M resources according to the N available resources after an interval of preset duration T, or redetermining, by the first UE, N available resources from the S resources after an interval of preset duration T, where T is determined according to at least one of a quantity N of available resources, a quantity N−S of unavailable resources, a proportion N/S of the available resources, a quantity c of conflicts of the first UE, a conflict time w, a service priority Q of the first UE, or a priority of the first UE, c is an integer greater than or equal to 0, and w is a positive number.

With reference to the first aspect, in a fifth possible implementation of the first aspect, after the determining, by first UE, N available resources from S resources, the method further includes determining whether the first UE meets a first preset condition, and if the first UE meets the first preset condition, determining, by the first UE, the M resources according to the N available resources, or if the first UE does not meet the first preset condition, after an interval of preset duration T, determining, by the first UE, the M resources according to the N available resources, or redetermining N available resources from the S resources and determining the M resources according to the N available resources, where T is determined according to at least one of a quantity N of available resources, a quantity N−S of unavailable resources, a proportion N/S of the available resources, a quantity c of conflicts of the first UE, a conflict time w, a service priority Q of the first UE, or a priority of the first UE, the first preset condition is N≥a, N/S≥b, Q≥$Q_0$, the quantity c of conflicts of the first UE is greater than $C_0$, the conflict time w of the first UE is greater than $W_0$, or the service priority Q of the first UE or the priority of the UE is greater than $Q_0$, a is a resource threshold, b is a minimum proportion of the available resources to preset resources, $C_0$ is a threshold of the quantity of conflicts, $W_0$ is a conflict time threshold, and $Q_0$ is a priority threshold, c is an integer greater than or equal to 0, and w is a positive number.

With reference to the fourth or the fifth possible implementation of the first aspect, in a sixth possible implementation of the first aspect, the determining, by the first UE, the M resources according to the N available resources after an interval of preset duration T includes randomly selecting, by the first UE, the M resources from the N available resources, or obtaining, by the first UE, L resources according to the N available resources, and randomly selecting, by the first UE, the M resources from the L available resources.

With reference to the sixth possible implementation of the first aspect, in a seventh possible implementation of the first aspect, the obtaining, by the first UE, L resources according to the N available resources includes obtaining, by the first UE, the L resources after performing an operation on the N available resources by using a preset rule.

With reference to the fourth or the fifth possible implementation of the first aspect, in an eighth possible implementation of the first aspect, the data sent by the first UE to the at least one UE is new data obtained after original data is discarded, or is the original data.

With reference to the fourth or the fifth possible implementation of the first aspect, in a ninth possible implementation of the first aspect, that T is determined according to at least one of a quantity N of available resources, a quantity N−S of unavailable resources, a proportion N/S of the available resources, a quantity c of conflicts of the first UE, a conflict time w, a service priority Q of the first UE, or a priority of the first UE specifically includes if the quantity c of conflicts of the first UE is greater than the threshold $C_0$, the conflict time w of the first UE is greater than the threshold $W_0$, or the service priority Q of the first UE or the priority of the UE is higher than the threshold $Q_0$, the preset duration T is equal to 0, or the preset duration T is T=$f(x)$, where x is one of N, N−S, N/S, the service priority Q of the first UE, the priority of the UE, a value customized by the first UE, c, w, or a function g(c, w) of c and w, and different values of x are corresponding to different functions represented by $f(x)$.

With reference to the first aspect, in a tenth possible implementation of the first aspect, the sending, by the first UE, data to at least one second UE by using the M resources includes determining, by the first UE, a transmit probability P, and sending the data to the at least one second UE on the M resources according to the transmit probability P, where the transmit probability P is determined according to at least one of a quantity N of available resources, a quantity N−S of unavailable resources, a proportion N/S of the available resources, a quantity c of conflicts of the first UE, a conflict time w, a service priority Q of the first UE, or a priority of the first UE.

With reference to the first aspect, in an eleventh possible implementation of the first aspect, the sending, by the first UE, data to at least one second UE by using the M resources includes determining whether the first UE meets a second preset condition, and if the first UE meets the second preset condition, sending, by the first UE, the data to the at least one second UE on the M resources, or if the first UE does not meet the second preset condition, determining, by the first UE, a transmit probability P, and sending the data to the at least one second UE on the M resources according to the transmit probability P, where P is determined according to at least one of a quantity N of available resources, a quantity N−S of unavailable resources, a proportion N/S of the available resources, a quantity c of conflicts of the first UE, a conflict time w, a service priority Q of the first UE, or a priority of the first UE, the second preset condition is N≥a, N/S≥b, Q≥00, the quantity c of conflicts of the first UE is greater than $C_0$, the conflict time w of the first UE is greater than $W_0$, or the service priority Q of the first UE or the priority of the UE is greater than $Q_0$, a is a resource threshold, b is a minimum proportion of the available resources to preset resources, $C_0$ is a threshold of the quantity of conflicts, $W_0$ is a conflict time threshold, and $Q_0$ is a priority threshold, c is an integer greater than or equal to 0, and w is a positive number.

With reference to the first aspect, in a twelfth possible implementation of the first aspect, that P is determined according to at least one of a quantity N of available resources, a quantity N−S of unavailable resources, a proportion N/S of the available resources, a quantity c of conflicts of the first UE, a conflict time w, a service priority Q of the first UE, or a priority of the first UE specifically includes if the quantity c of conflicts of the first UE is greater than the threshold $C_0$, the conflict time w of the first UE is greater than the threshold $W_0$, or the service priority Q of the first UE or the priority of the UE is higher than the threshold $Q_0$, the transmit probability P is equal to 1, or the transmit probability P is P=$f(x)$, where x is one of N, N−S, N/S, the service priority Q of the first UE, the priority of the UE, a value customized by the first UE, c, w, or a function g(c, w) of c and w, and different values of x are corresponding to different functions represented by $f(x)$.

With reference to the first aspect, in a thirteenth possible implementation of the first aspect, S is corresponding to a quantity of UEs in a first group, and N is corresponding to a quantity of UEs that are in the first group and that send data, or S is corresponding to a quantity of neighboring UEs of the first UE, N is corresponding to a quantity of UEs that are in the neighboring UEs of the first UE and that send data, and the neighboring UE of the first UE is UE that can directly communicate with the first UE.

With reference to the first aspect, in a fourteenth possible implementation of the first aspect, the resource is at least one of a scheduling assignment SA resource, a service data resource, or a discovery resource, and the data sent to the at least one second UE is at least one of SA, service data, or a discovery signal.

With reference to the first aspect, in a fifteenth possible implementation of the first aspect, the resource is at least one of a resource in an SA resource pool, a resource in a service data resource pool, or a resource in a discovery resource pool, or is a resource that is available for sending at least one of SA, service data, or a discovery signal in a period of time.

According to a second aspect, a resource conflict reducing method is disclosed, including obtaining, by first UE, a preset parameter, and sending, by the first UE, data to at least one second UE according to the preset parameter by using Z resources of S resources, where S is a resource quantity indicated by resource configuration information obtained by the first UE, and the preset parameter is at least one of a quantity c of conflicts of the first UE, a conflict time w of the first UE, a service priority Q of the first UE, or a priority of the first UE, and S is an integer greater than or equal to 1, Z is an integer less than or equal to S, c is an integer greater than or equal to 0, and w is a positive number.

With reference to the second aspect, in a first possible implementation of the second aspect, before the sending, by the first UE, data to at least one second UE according to the preset parameter by using Z resources of S resources, the method further includes obtaining, by the first UE, the resource configuration information, where the resource configuration information includes information about the S resources, and the resource configuration information is configured by a base station or preconfigured.

With reference to the second aspect, in a second possible implementation of the second aspect, the sending, by the first UE, data to at least one second UE according to the preset parameter by using Z resources of S resources includes determining, by the first UE, preset duration T according to the preset parameter, randomly determining, by the first UE, the Z resources from the S resources after an interval of the preset duration T, and sending the data to the at least one second UE on the Z resources.

With reference to the second aspect, in a third possible implementation of the second aspect, the data sent by the first UE to the at least one second UE on the Z resources is new data obtained after original data is discarded, or is the original data, the first UE determines preset duration T according to the preset parameter, the first UE randomly determines the Z resources from the S resources after an interval of the preset duration T, and the data is sent to the at least one second UE on the Z resources.

With reference to the third possible implementation of the second aspect, in a fourth possible implementation of the second aspect, the sending, by the first UE, data to at least one second UE according to the preset parameter by using Z resources of S resources includes determining whether the quantity c of conflicts of the first UE is less than a threshold $C_0$, whether the conflict time w of the first UE is less than a threshold $W_0$, or whether the service priority Q of the first UE or the priority of the UE is lower than a threshold $Q_0$, and if the quantity c of conflicts of the first UE is less than the threshold $C_0$, the conflict time w of the first UE is less than the threshold $W_0$, or the service priority Q of the first UE or the priority of the UE is lower than the threshold $Q_0$, determining the preset duration T according to the preset parameter, and randomly determining the Z resources from the S resources at an interval of the preset duration T, and sending the data to the at least one second UE on the Z resources, or if the quantity c of conflicts of the first UE is not less than the threshold $C_0$, the conflict time w of the first UE is not less than the threshold $W_0$, or the service priority Q of the first UE or the priority of the UE is not lower than the threshold $Q_0$, sending the data to the at least one second UE on the Z resources.

With reference to the second aspect, in a fifth possible implementation of the second aspect, the sending, by the first UE, data to at least one second UE according to the preset parameter by using Z resources of S resources includes randomly determining, by the first UE, the Z resources from the S resources, and determining, by the first UE, a transmit probability P according to the preset parameter, and sending the data to the at least one second UE on the Z resources according to the transmit probability P.

With reference to the second aspect, in a sixth possible implementation of the second aspect, the determining preset duration T according to the preset parameter includes when the quantity c of conflicts of the first UE is greater than the threshold $C_0$ or the conflict time w of the first UE is greater than the threshold $W_0$, determining that the preset duration T is 0, or determining that the preset duration T is T=$f(x)$, where x is one of N, N−S, N/S, the service priority Q of the first UE, a value customized by the first UE, c, w, or a function g(c, w) of c and w, and different values of x are corresponding to different functions represented by $f(x)$.

With reference to the second aspect, in a seventh possible implementation of the second aspect, the sending, by the first UE, data to at least one second UE according to the preset parameter by using Z resources of S resources includes randomly determining, by the first UE, the Z resources from the S resources, determining whether the quantity c of conflicts of the first UE is less than a threshold $C_0$, whether the conflict time w of the first UE is less than a threshold $W_0$, or whether the service priority Q of the first UE or the priority of the UE is lower than a threshold $Q_0$, and if the quantity c of conflicts of the first UE is less than the threshold $C_0$, the conflict time w of the first UE is less than the threshold $W_0$, or the service priority Q of the first UE or the priority of the UE is lower than the threshold $Q_0$, determining a transmit probability P according to the preset parameter, and sending the data to the at least one second UE on the Z resources according to the transmit probability P, or if the quantity c of conflicts of the first UE is not less than the threshold $C_0$, the conflict time w of the first UE is not less than the threshold $W_0$, or the service priority Q of the first UE or the priority of the UE is not lower than the threshold $Q_0$, sending the data to the at least one second UE on the Z resources.

With reference to the second aspect, in an eighth possible implementation of the second aspect, the determining a transmit probability P according to the preset parameter includes when the quantity c of conflicts of the first UE is greater than the threshold $C_0$ or the conflict time w of the first UE is greater than the threshold $W_0$, determining that the transmit probability P is 1, or determining that the transmit probability P is P=$f(x)$, where x is one of N, N−S, N/S, the service priority Q of the first UE, a value customized by the first UE, c, w, or a function g(c, w) of c and w, and different values of x are corresponding to different functions represented by $f(x)$.

According to a third aspect, UE is disclosed, including a determining unit, configured to determine N available resources from S resources, where S is a resource quantity indicated by resource configuration information obtained by the first UE, and the determining unit is further configured to determine M resources according to the N available resources, and a sending unit, configured to send data to at least one second UE by using the M resources, where S is an integer greater than or equal to 1, N is an integer greater than or equal to 0 and less than or equal to S, and M is an integer greater than or equal to 0 and less than or equal to N.

With reference to the third aspect, in a first possible implementation of the third aspect, the determining unit is specifically configured to randomly select the M resources from the N available resources.

With reference to the third aspect, in a second possible implementation of the third aspect, an obtaining unit is further included, where the obtaining unit is configured to obtain the resource configuration information, where the resource configuration information includes information about the S resources, and the resource configuration information is configured by a base station or preconfigured.

With reference to the third aspect, in a third possible implementation of the third aspect, the determining unit is specifically configured to detect energy or power of a signal carried on each of the S resources, and if the energy of the signal carried on the resource is less than a threshold m or the power of the signal carried on the resource is less than a threshold n, determine that the resource is the available resource, where m and n are positive numbers, or detect a sequence carried on each of the S resources, and if the resource carries no preset sequence, determine that the resource is the available resource.

With reference to the third aspect, in a fourth possible implementation of the third aspect, the determining unit is specifically configured to after determining the N available resources from the S resources, determine the M resources according to the N available resources after an interval of preset duration T, or redetermine, by the first UE, N available resources from the S resources after an interval of preset duration T, where T is determined according to at least one of a quantity N of available resources, a quantity N−S of unavailable resources, a proportion N/S of the available resources, a quantity c of conflicts of the first UE, a conflict time w, a service priority Q of the first UE, or a priority of the first UE, c is an integer greater than or equal to 0, and w is a positive number.

With reference to the third aspect, in a fifth possible implementation of the third aspect, the determining unit is specifically configured to after determining the N available resources from the S resources, determine whether the first UE meets a first preset condition, and if the first UE meets the first preset condition, determine the M resources according to the N first time-frequency resources, or if the first UE does not meet the first preset condition, determine the M resources according to the N available resources after an interval of preset duration T, where T is determined according to at least one of a quantity N of available resources, a quantity N−S of unavailable resources, a proportion N/S of the available resources, a quantity c of conflicts of the first UE, a conflict time w, a service priority Q of the first UE, or a priority of the first UE, the first preset condition is N≥a, N/S≥b, Q≥$Q_0$, the quantity c of conflicts of the first UE is greater than $C_0$, the conflict time w of the first UE is greater than $W_0$, or the service priority Q of the first UE or the priority of the UE is greater than $Q_0$, a is a resource threshold, b is a minimum proportion of the available resources to preset resources, $C_0$ is a threshold of the quantity of conflicts, $W_0$ is a conflict time threshold, and $Q_0$ is a priority threshold, c is an integer greater than or equal to 0, and w is a positive number.

With reference to the third aspect, in a sixth possible implementation of the third aspect, that the determining unit determines the M resources according to the N available resources after an interval of preset duration T includes randomly selecting the M resources from the N available resources, or obtaining L resources according to the N available resources, and randomly selecting, by the first UE, the M resources from the L available resources.

With reference to the third aspect, in a seventh possible implementation of the third aspect, that the determining unit obtains L resources according to the N available resources specifically includes obtaining the L resources after performing an operation on the N available resources by using a preset rule.

With reference to the third aspect, in an eighth possible implementation of the third aspect, the data sent by the sending unit to the at least one UE is new data obtained after original data is discarded, or is the original data.

With reference to the third aspect, in a ninth possible implementation of the third aspect, that T is determined according to at least one of a quantity N of available resources, a quantity N−S of unavailable resources, a proportion N/S of the available resources, a quantity c of conflicts of the first UE, a conflict time w, a service priority Q of the first UE, or a priority of the first UE specifically includes if the quantity c of conflicts of the first UE is greater than the threshold $C_0$, the conflict time w of the first UE is greater than the threshold $W_0$, or the service priority Q of the first UE or the priority of the UE is higher than the threshold $Q_0$, the preset duration T is equal to 0, or the preset duration T is T=$f(x)$, where x is one of N, N−S, N/S, the service priority Q of the first UE, the priority of the UE, a value customized by the first UE, c, w, or a function g(c, w) of c and w, and different values of x are corresponding to different functions represented by $f(x)$.

With reference to the third aspect, in a tenth possible implementation of the third aspect, the determining unit is further configured to determine a transmit probability P, and the sending unit is specifically configured to send the data to the at least one second UE on the M resources according to the transmit probability P, where the transmit probability P is determined according to at least one of a quantity N of available resources, a quantity N−S of unavailable resources, a proportion N/S of the available resources, a quantity c of conflicts of the first UE, a conflict time w, a service priority Q of the first UE, or a priority of the first UE.

With reference to the third aspect, in an eleventh possible implementation of the third aspect, a judging unit is further included, where the judging unit is configured to determine whether the first UE meets a second preset condition, and if the judging unit determines that the first UE meets the second preset condition, the sending unit sends the data to the at least one second UE on the M resources, or if the judging unit determines that the first UE does not meet the second preset condition, the determining unit determines a transmit probability P, and the sending unit sends the data to the at least one second UE on the M resources according to the transmit probability P, where P is determined according to at least one of a quantity N of available resources, a quantity N−S of unavailable resources, a proportion N/S of the available resources, a quantity c of conflicts of the first UE, a conflict time w, a service priority Q of the first UE, or a priority of the first UE, the second preset condition is N≥a, N/S≥b, Q≥$Q_0$, the quantity c of conflicts of the first UE is greater than $C_0$, the conflict time w of the first UE is greater than $W_0$, or the service priority Q of the first UE or the priority of the UE is greater than $Q_0$, a is a resource threshold, b is a minimum proportion of the available resources to preset resources, $C_0$ is a threshold of the quantity of conflicts, $W_0$ is a conflict time threshold, and $Q_0$ is a priority threshold, c is an integer greater than or equal to 0, and w is a positive number.

With reference to the third aspect, in a twelfth possible implementation of the third aspect, that P is determined according to at least one of a quantity N of available resources, a quantity N−S of unavailable resources, a proportion N/S of the available resources, a quantity c of conflicts of the first UE, a conflict time w, a service priority Q of the first UE, or a priority of the first UE specifically includes if the quantity c of conflicts of the first UE is greater than the threshold $C_0$, the conflict time w of the first UE is greater than the threshold $W_0$, or the service priority Q of the first UE or the priority of the UE is higher than the threshold $Q_0$, the transmit probability P is equal to 1, or the transmit probability P is P=$f(x)$, where x is one of N, N–S, N/S, the service priority Q of the first UE, the priority of the UE, a value customized by the first UE, c, w, or a function g(c, w) of c and w, and different values of x are corresponding to different functions represented by $f(x)$.

With reference to the third aspect, in a thirteenth possible implementation of the third aspect, S is corresponding to a quantity of UEs in a first group corresponding to the first UE, and N is corresponding to a quantity of UEs that are in the first group and that send data, or S is corresponding to a quantity of neighboring UEs of the first UE, N is corresponding to a quantity of UEs that are in the neighboring UEs of the first UE and that send data, and the neighboring UE of the first UE is UE that can directly communicate with the first UE.

With reference to the third aspect, in a fourteenth possible implementation of the third aspect, the resource is at least one of a scheduling assignment SA resource, a service data resource, or a discovery resource, and the data sent to the at least one second UE is at least one of SA, service data, or a discovery signal.

With reference to the third aspect, in a fifteenth possible implementation of the third aspect, the resource is at least one of a resource in an SA resource pool, a resource in a service data resource pool, or a resource in a discovery resource pool, or is a resource that is available for sending at least one of SA, service data, or a discovery signal in a period of time.

According to a fourth aspect, UE is disclosed, including an obtaining unit, configured to obtain a preset parameter, and a sending unit, configured to send data to at least one second UE according to the preset parameter by using Z resources of S resources, where S is a resource quantity indicated by resource configuration information obtained by the first UE, and the preset parameter is at least one of a quantity c of conflicts of the first UE, a conflict time w of the first UE, a service priority Q of the first UE, or a priority of the UE.

With reference to the fourth aspect, in a first possible implementation of the fourth aspect, an obtaining unit is further included, where the obtaining unit is configured to obtain the resource configuration information, where the resource configuration information includes information about the S resources, and the resource configuration information is configured by a base station or preconfigured.

With reference to the fourth aspect, in a second possible implementation of the fourth aspect, a determining unit is further included, where the determining unit is configured to determine preset duration T according to the preset parameter, and randomly determine the Z resources from the S resources after an interval of the preset duration T, and the sending unit is configured to send the data to the at least one second UE on the Z resources.

With reference to the fourth aspect, in a third possible implementation of the fourth aspect, the data sent by the first UE to the at least one second UE on the Z resources is new data obtained after original data is discarded, or is the original data.

With reference to the fourth aspect, in a fourth possible implementation of the fourth aspect, a judging unit is further included, where the judging unit is configured to determine whether the quantity c of conflicts of the first UE is less than a threshold $C_0$, whether the conflict time w of the first UE is less than a threshold $W_0$, or whether the service priority Q of the first UE or the priority of the UE is lower than a threshold $Q_0$, a determining unit is configured to if the quantity c of conflicts of the first UE is less than the threshold $C_0$, the conflict time w of the first UE is less than the threshold $W_0$, or the service priority Q of the first UE or the priority of the UE is lower than the threshold $Q_0$, determine preset duration T according to the preset parameter, and randomly determine the Z resources from the S resources at an interval of the preset duration T, and the sending unit is configured to send the data to the at least one second UE on the Z resources, or the sending unit is further configured to if the quantity c of conflicts of the first UE is not less than the threshold $C_0$, the conflict time w of the first UE is not less than the threshold $W_0$, or the service priority Q of the first UE or the priority of the UE is not lower than the threshold $Q_0$, send the data to the at least one second UE on the Z resources.

With reference to the fourth aspect, in a fifth possible implementation of the fourth aspect, the determining preset duration T according to the preset parameter includes when the quantity c of conflicts of the first UE is greater than the threshold $C_0$ or the conflict time w of the first UE is greater than the threshold $W_0$, determining that the preset duration T is 0, or determining that the preset duration T is T=$f(x)$, where x is one of N, N–S, N/S, the service priority Q of the first UE, a value customized by the first UE, c, w, or a function g(c, w) of c and w, and different values of x are corresponding to different functions represented by $f(x)$.

With reference to the fourth aspect, in a sixth possible implementation of the fourth aspect, the determining preset duration T according to the preset parameter includes when the quantity c of conflicts of the first UE is greater than the threshold $C_0$ or the conflict time w of the first UE is greater than the threshold $W_0$, determining that the preset duration T is 0, or determining that the preset duration T is T=$f(x)$, where x is one of N, N–S, N/S, the service priority Q of the first UE, a value customized by the first UE, c, w, or a function g(c, w) of c and w, and different values of x are corresponding to different functions represented by $f(x)$.

With reference to the fourth aspect, in a seventh possible implementation of the fourth aspect, a judging unit is further included, a determining unit is configured to randomly determine the Z resources from the S resources, the judging unit is configured to determine whether the quantity c of conflicts of the first UE is less than a threshold $C_0$, whether the conflict time w of the first UE is less than a threshold $W_0$, or whether the service priority Q of the first UE or the priority of the UE is lower than a threshold $Q_0$, the determining unit is configured to if the quantity c of conflicts of the first UE is less than the threshold $C_0$, the conflict time w of the first UE is less than the threshold $W_0$, or the service priority Q of the first UE or the priority of the UE is lower than the threshold $Q_0$, determine a transmit probability P according to the preset parameter, and the sending unit is configured to send the data to the at least one second UE on the Z resources according to the transmit probability P, or the sending unit is further configured to if the quantity c of conflicts of the first UE is not less than the threshold $C_0$, the conflict time w of the first UE is not less than the threshold $W_0$, or the service priority Q of the first UE or the priority of the UE is not lower than the threshold $Q_0$, send the data to the at least one second UE on the Z resources.

With reference to the fourth aspect, in an eighth possible implementation of the fourth aspect, the determining a transmit probability P according to the preset parameter includes when the quantity c of conflicts of the first UE is greater than the threshold $C_0$ or the conflict time w of the first UE is greater than the threshold $W_0$, determining that the transmit probability P is 1, or determining that the transmit probability P is P=ƒ(x), where x is one of N, N−S, N/S, the service priority Q of the first UE, a value customized by the first UE, c, w, or a function g(c, w) of c and w, and different values of x are corresponding to different functions represented by ƒ(x).

According to a fifth aspect, UE is disclosed, including a processor, configured to determine N available resources from S resources, where S is a resource quantity indicated by resource configuration information obtained by the first UE, and determine M resources according to the N available resources, and a transmitter, configured to send data to at least one second UE by using the M resources, where S is an integer greater than or equal to 1, N is an integer greater than or equal to 0 and less than or equal to S, and M is an integer greater than or equal to 0 and less than or equal to N.

With reference to the fifth aspect, in a first possible implementation of the fifth aspect, the processor is specifically configured to randomly select the M resources from the N available resources.

With reference to the fifth aspect, in a second possible implementation of the fifth aspect, the processor is configured to obtain the resource configuration information, where the resource configuration information includes information about the S resources, and the resource configuration information is configured by a base station or preconfigured.

With reference to the fifth aspect, in a third possible implementation of the fifth aspect, the processor is specifically configured to detect energy or power of a signal carried on each of the S resources, and if the energy of the signal carried on the resource is less than a threshold m or the power of the signal carried on the resource is less than a threshold n, determine that the resource is the available resource, where m and n are positive numbers, or detect a sequence carried on each of the S resources, and if the resource carries no preset sequence, determine that the resource is the available resource.

With reference to the fifth aspect, in a fourth possible implementation of the fifth aspect, the processor is specifically configured to after determining the N available resources from the S resources, determine the M resources according to the N available resources after an interval of preset duration T, or redetermine, by the first UE, N available resources from the S resources after an interval of preset duration T, where T is determined according to at least one of a quantity N of available resources, a quantity N−S of unavailable resources, a proportion N/S of the available resources, a quantity c of conflicts of the first UE, a conflict time w, a service priority Q of the first UE, or a priority of the first UE, c is an integer greater than or equal to 0, and w is a positive number.

With reference to the fifth aspect, in a fifth possible implementation of the fifth aspect, the processor is specifically configured to after determining the N available resources from the S resources, determine whether the first UE meets a first preset condition, and if the first UE meets the first preset condition, determine the M resources according to the N first time-frequency resources, or if the first UE does not meet the first preset condition, determine the M resources according to the N available resources after an interval of preset duration T, where T is determined according to at least one of a quantity N of available resources, a quantity N−S of unavailable resources, a proportion N/S of the available resources, a quantity c of conflicts of the first UE, a conflict time w, a service priority Q of the first UE, or a priority of the first UE, the first preset condition is N≥a, N/S≥b, Q≥$Q_0$, the quantity c of conflicts of the first UE is greater than $C_0$, the conflict time w of the first UE is greater than $W_0$, or the service priority Q of the first UE or the priority of the UE is greater than $Q_0$, a is a resource threshold, b is a minimum proportion of the available resources to preset resources, $C_0$ is a threshold of the quantity of conflicts, $W_0$ is a conflict time threshold, and $Q_0$ is a priority threshold, c is an integer greater than or equal to 0, and w is a positive number.

With reference to the fifth aspect, in a sixth possible implementation of the fifth aspect, that the processor determines the M resources according to the N available resources after an interval of preset duration T includes randomly selecting the M resources from the N available resources, or obtaining L resources according to the N available resources, and randomly selecting, by the first UE, the M resources from the L available resources.

With reference to the fifth aspect, in a seventh possible implementation of the fifth aspect, that the processor obtains L resources according to the N available resources specifically includes obtaining the L resources after performing an operation on the N available resources by using a preset rule.

With reference to the fifth aspect, in an eighth possible implementation of the fifth aspect, the data sent by the transmitter to the at least one UE is new data obtained after original data is discarded, or is the original data.

With reference to the fifth aspect, in a ninth possible implementation of the fifth aspect, that T is determined according to at least one of a quantity N of available resources, a quantity N−S of unavailable resources, a proportion N/S of the available resources, a quantity c of conflicts of the first UE, a conflict time w, a service priority Q of the first UE, or a priority of the first UE specifically includes if the quantity c of conflicts of the first UE is greater than the threshold $C_0$, the conflict time w of the first UE is greater than the threshold $W_0$, or the service priority Q of the first UE or the priority of the UE is higher than the threshold $Q_0$, the preset duration T is equal to 0, or the preset duration T is T=ƒ(x), where x is one of N, N−S, N/S, the service priority Q of the first UE, the priority of the UE, a value customized by the first UE, c, w, or a function g(c, w) of c and w, and different values of x are corresponding to different functions represented by ƒ(x).

With reference to the fifth aspect, in a tenth possible implementation of the fifth aspect, the processor is further configured to determine a transmit probability P, and the transmitter is specifically configured to send the data to the at least one second UE on the M resources according to the transmit probability P, where the transmit probability P is determined according to at least one of a quantity N of available resources, a quantity N−S of unavailable resources, a proportion N/S of the available resources, a quantity c of conflicts of the first UE, a conflict time w, a service priority Q of the first UE, or a priority of the first UE.

With reference to the fifth aspect, in an eleventh possible implementation of the fifth aspect, the processor is configured to determine whether the first UE meets a second preset condition, and if the processor determines that the first UE meets the second preset condition, the transmitter sends the data to the at least one second UE on the M resources, or if the processor determines that the first UE does not meet the second preset condition, the determining unit determines a transmit probability P, and the transmitter sends the data to the at least one second UE on the M resources according to the transmit probability P, where P is determined according to at least one of a quantity N of available resources, a quantity N−S of unavailable resources, a proportion N/S of the available resources, a quantity c of conflicts of the first UE, a conflict time w, a service priority Q of the first UE, or a priority of the first UE, the second preset condition is N≥a, N/S≥b, Q≥$Q_0$, the quantity c of conflicts of the first UE is greater than $C_0$, the conflict time w of the first UE is greater than $W_0$, or the service priority Q of the first UE or the priority of the UE is greater than $Q_0$, a is a resource threshold, b is a minimum proportion of the available resources to preset resources, $C_0$ is a threshold of the quantity of conflicts, $W_0$ is a conflict time threshold, and $Q_0$ is a priority threshold, c is an integer greater than or equal to 0, and w is a positive number.

With reference to the fifth aspect, in a twelfth possible implementation of the fifth aspect, that P is determined according to at least one of a quantity N of available resources, a quantity N−S of unavailable resources, a proportion N/S of the available resources, a quantity c of conflicts of the first UE, a conflict time w, a service priority Q of the first UE, or a priority of the first UE specifically includes if the quantity c of conflicts of the first UE is greater than the threshold $C_0$, the conflict time w of the first UE is greater than the threshold $W_0$, or the service priority Q of the first UE or the priority of the UE is higher than the threshold $Q_0$, the transmit probability P is equal to 1, or the transmit probability P is P=$f(x)$, where x is one of N, N−S, N/S, the service priority Q of the first UE, the priority of the UE, a value customized by the first UE, c, w, or a function g(c, w) of c and w, and different values of x are corresponding to different functions represented by $f(x)$.

With reference to the fifth aspect, in a thirteenth possible implementation of the fifth aspect, S is corresponding to a quantity of UEs in a first group corresponding to the first UE, and N is corresponding to a quantity of UEs that are in the first group and that send data, or S is corresponding to a quantity of neighboring UEs of the first UE, N is corresponding to a quantity of UEs that are in the neighboring UEs of the first UE and that send data, and the neighboring UE of the first UE is UE that can directly communicate with the first UE.

With reference to the fifth aspect, in a fourteenth possible implementation of the fifth aspect, the resource is at least one of a scheduling assignment SA resource, a service data resource, or a discovery resource, and the data sent to the at least one second UE is at least one of SA, service data, or a discovery signal.

With reference to the fifth aspect, in a fifteenth possible implementation of the fifth aspect, the resource is at least one of a resource in an SA resource pool, a resource in a service data resource pool, or a resource in a discovery resource pool, or is a resource that is available for sending at least one of SA, service data, or a discovery signal in a period of time.

According to a sixth aspect, UE is disclosed, including a processor, configured to obtain a preset parameter, and a transmitter, configured to send data to at least one second UE according to the preset parameter by using Z resources of S resources, where S is a resource quantity indicated by resource configuration information obtained by the first UE, and the preset parameter is at least one of a quantity c of conflicts of the first UE, a conflict time w of the first UE, a service priority Q of the first UE, or a priority of the UE, and S is an integer greater than or equal to 1, Z is an integer less than or equal to S, c is an integer greater than or equal to 0, and w is a positive number.

With reference to the sixth aspect, in a first possible implementation of the sixth aspect, the processor is configured to obtain the resource configuration information, where the resource configuration information includes information about the S resources, and the resource configuration information is configured by a base station or preconfigured.

With reference to the sixth aspect, in a second possible implementation of the sixth aspect, the processor is configured to determine preset duration T according to the preset parameter, and randomly determine the Z resources from the S resources after an interval of the preset duration T, and the transmitter is configured to send the data to the at least one second UE on the Z resources.

With reference to the sixth aspect, in a third possible implementation of the sixth aspect, the data sent by the first UE to the at least one second UE on the Z resources is new data obtained after original data is discarded, or is the original data.

With reference to the sixth aspect, in a fourth possible implementation of the sixth aspect, the processor is configured to determine whether the quantity c of conflicts of the first UE is less than a threshold $C_0$, whether the conflict time w of the first UE is less than a threshold $W_0$, or whether the service priority Q of the first UE or the priority of the UE is lower than a threshold $Q_0$, and the second processor is configured to if the quantity c of conflicts of the first UE is less than the threshold $C_0$, the conflict time w of the first UE is less than the threshold $W_0$, or the service priority Q of the first UE or the priority of the UE is lower than the threshold $Q_0$, determine preset duration T according to the preset parameter, and randomly determine the Z resources from the S resources at an interval of the preset duration T, and the transmitter is configured to send the data to the at least one second UE on the Z resources, or the transmitter is further configured to if the quantity c of conflicts of the first UE is not less than the threshold $C_0$, the conflict time w of the first UE is not less than the threshold $W_0$, or the service priority Q of the first UE or the priority of the UE is not lower than the threshold $Q_0$, send the data to the at least one second UE on the Z resources.

With reference to the sixth aspect, in a fifth possible implementation of the sixth aspect, the determining preset duration T according to the preset parameter includes when the quantity c of conflicts of the first UE is greater than the threshold $C_0$ or the conflict time w of the first UE is greater than the threshold $W_0$, determining that the preset duration T is 0, or determining that the preset duration T is T=$f(x)$, where x is one of N, N−S, N/S, the service priority Q of the first UE, a value customized by the first UE, c, w, or a function g(c, w) of c and w, and different values of x are corresponding to different functions represented by $f(x)$.

With reference to the sixth aspect, in a sixth possible implementation of the sixth aspect, the determining preset duration T according to the preset parameter includes when the quantity c of conflicts of the first UE is greater than the threshold $C_0$ or the conflict time w of the first UE is greater than the threshold $W_0$, determining that the preset duration T is 0, or determining that the preset duration T is T=$f(x)$, where x is one of N, N−S, N/S, the service priority Q of the first UE, a value customized by the first UE, c, w, or a function g(c, w) of c and w, and different values of x are corresponding to different functions represented by $f(x)$.

With reference to the sixth aspect, in a seventh possible implementation of the sixth aspect, the processor is configured to randomly determine the Z resources from the S resources, and determine whether the quantity c of conflicts of the first UE is less than a threshold $C_0$, whether the conflict time w of the first UE is less than a threshold $W_0$, or whether the service priority Q of the first UE or the priority of the UE is lower than a threshold $Q_0$, and the processor is configured to if the quantity c of conflicts of the first UE is less than the threshold $C_0$, the conflict time w of the first UE is less than the threshold $W_0$, or the service priority Q of the first UE or the priority of the UE is lower than the threshold $Q_0$, determine a transmit probability P according to the preset parameter, and the transmitter is configured to send the data to the at least one second UE on the Z resources according to the transmit probability P, or if the quantity c of conflicts of the first UE is not less than the threshold $C_0$, the conflict time w of the first UE is not less than the threshold $W_0$, or the service priority Q of the first UE or the priority of the UE is not lower than the threshold $Q_0$, send the data to the at least one second UE on the Z resources.

With reference to the sixth aspect, in an eighth possible implementation of the sixth aspect, the determining a transmit probability P according to the preset parameter includes when the quantity c of conflicts of the first UE is greater than the threshold $C_0$ or the conflict time w of the first UE is greater than the threshold $W_0$, determining that the transmit probability P is 1, or determining that the transmit probability P is $P=f(x)$, where x is one of N, N–S, N/S, the service priority Q of the first UE, a value customized by the first UE, c, w, or a function g(c, w) of c and w, and different values of x are corresponding to different functions represented by $f(x)$.

According to the resource conflict reducing method and the UE that are provided in the embodiments of the present invention, the first UE determines the N available resources from the S resources, determines the M resources according to the N available resources, and finally sends the data to the at least one second UE by using the M resources. Alternatively, the first UE sends the data to the at least one second UE according to the preset parameter by using the Z resources of the S resources. The preset parameter is at least one of the quantity c of conflicts of the first UE, the conflict time w of the first UE, the service priority Q of the first UE, or the priority of the UE. According to an existing D2D technology, UE randomly selects a resource in a preset resource pool to transmit data, and a conflict is caused because different UEs preempt a same resource. According to the method provided in the present invention, each UE detects a preset resource, determines an available resource, and then transmits data according to the determined available resource. Alternatively, the UE determines a transmit probability or a wait period with reference to a parameter such as a quantity of conflicts of the UE, a conflict time of the UE, or a service priority of the UE. Different UEs are corresponding to different wait periods or transmit probabilities. This can reduce a probability that the UE competes for a same resource with another UE, and reduce, to some extent, a conflict generated in the D2D technology because transmit UE preempts a resource.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
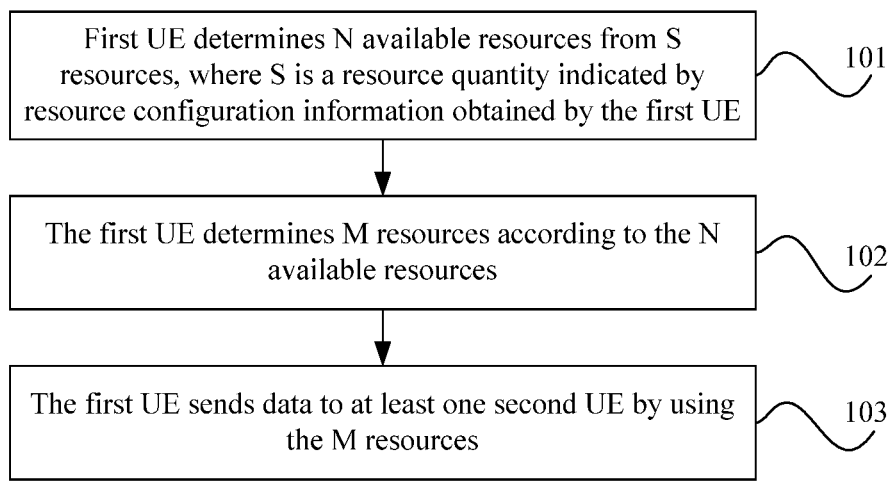
FIG. 1 is a schematic flowchart of a resource conflict reducing method according to Embodiment 1 of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In a D2D communication mode, devices are directly connected for communication, and direct communication may be performed between terminals, and no base station is required for forwarding. Therefore, data load of a base station can be reduced, a spectrum resource can be utilized better, and spectrum utilization and a data rate can be increased. In a D2D technology, considering that the base station has relatively strong interference immunity, each UE multiplexes an uplink spectrum resource of an LTE-A system.

Currently, a contention-based manner in a D2D resource allocation mechanism is UE that needs to send data or signaling needs to obtain, from a resource pool in a contention manner, a time-frequency resource used for sending.

D2D communication is classified into two types: D2D device discovery and D2D device communication. In the D2D device discovery, UE sends only a discovery signal, and in the D2D device communication, UE sends control signaling and data.

From a perspective of transmit UE (sending control signaling or service data, or sending a discovery signal), currently, there are two D2D resource allocation modes: a centralized control manner and a contention-based manner. In a centralized control method, a D2D resource is allocated by a central control device (such as a base station or a repeater station), and the resource is allocated in a scheduling manner to the transmit UE for use. Resource allocation in the centralized control manner is mainly used in a scenario with network coverage. In a contention-based distributed resource multiplexing method, the transmit UE obtains a transmit resource from a resource pool in a contention manner. In the scenario with network coverage, a resource pool is an entire resource block allocated by the base station, and all D2D users compete for a small resource block from the entire resource block. In a scenario without network coverage, a resource pool is predefined system bandwidth that can be obtained by a D2D user, and all D2D users compete for a resource from a predefined resource.

For the foregoing contention-based resource allocation manner, there is no central controller for coordination, and different UEs may compete for a same resource. Therefore, a conflict is generated. When there is a relatively large quantity of UEs, a probability of generating such a conflict situation is quite high.

In an existing mechanism, within the network coverage, the base station configures a transmit probability p for the transmit UE. The UE randomly selects a resource from a preset resource pool, and then sends a discovery signal on the randomly selected resource based on the probability p ($0<p\leq 1$, and a value range is $\{0.25, 0.5, 0.75, 1\}$). Beyond the network coverage, the probability p is obtained by means of preconfiguration.

In the prior art, data (or signaling) is sent based on the probability P preconfigured by the base station. It is most likely that the finally selected resource is still occupied. Consequently, a conflict is still generated. An effect of resolving the conflict by only blindly using a transmit probability less than 1 is relatively limited. In addition, for the scenario without network coverage, the UE cannot receive scheduling signaling from the base station, and further cannot send the data by using the transmit probability P configured by the base station.

Embodiment 1

This embodiment of the present invention provides a resource conflict reducing method that is executed by UE. As shown in FIG. 1, the method includes the following steps.

101. First UE determines N available resources from S resources, where S is a resource quantity indicated by resource configuration information obtained by the first UE.

The resource is at least one of a scheduling assignment (SA) resource, a service data resource, or a discovery resource, and data sent to at least one second UE is at least one of SA, service data, or a discovery signal. Alternatively, the resource is at least one of a resource in an SA resource pool, a resource in a service data resource pool, or a resource in a discovery resource pool, or is a resource that is available for sending at least one of SA, service data, or a discovery signal in a period of time.

For the UE, an available resource indicates that energy of a signal carried on the resource is less than a threshold m or power of the signal carried on the resource is less than a threshold n or that the resource carries no preset sequence. When the energy of the signal carried on the resource is quite low, the signal may be considered as a noise signal. Alternatively, if a sequence on the resource is not a sequence of an LTE system, a Wi-Fi system, or another system known to the UE, the resource is considered as the available resource.

The S resources may be within network coverage and be indicated by the resource configuration information sent by a base station, or may be resources preconfigured beyond network coverage. Before step 101, the UE receives the resource configuration information sent by the base station.

In specific implementation, the UE detects the S resources in a preset time period or in a preset resource range, to determine the available resources. The preset time period may be at least one sidelink (SL) period, such as an SA period, a discovery period, or a data (service data) period. The preset time period and/or the preset resource range are/is preconfigured, or are/is configured by the base station in a scenario with network coverage.

102. The first UE determines M resources according to the N available resources.

In specific implementation, the first UE may randomly select the M resources from the N available resources. Alternatively, the first UE obtains L resources according to the N available resources, and the first UE randomly selects the M resources from the L available resources. Alternatively, the first UE redetermines N available resources from the S resources, and the first UE randomly selects the M resources from the redetermined N available resources.

The obtaining, by the first UE, L resources according to the N available resources specifically includes obtaining, by the first UE, the L resources after performing an operation on the N available resources by using a preset rule. For example, the L resources may be obtained by means of calculation according to a frequency hopping formula.

In addition, the first UE selects the M resources. A size of the selected resources may be related to a type of data that is sent. For example, resources that need to be occupied for sending the SA are a subframe in a time domain and a PRB in a frequency domain. Resources that need to be occupied for sending the discovery signal are a subframe in the time domain and two PRBs in the frequency domain. Resources that need to be occupied for sending the service data are a subframe in the time domain and several PRBs in the frequency domain. Resources may be selected from the SA resource pool and the discovery resource pool by using a constant granularity, and any quantity of PRB resources may be selected from the data resource pool.

103. The first UE sends data to at least one second UE by using the M resources.

In specific implementation, how to send the data to the at least one second UE according to the M resources may be determined according to a parameter such as a quantity N of available resources, a quantity N–S of unavailable resources, a proportion N/S of the available resources, a quantity c of conflicts of the first UE, or a conflict time w.

The data may be sent on the M resources, or the data may be sent on the M resources according to a transmit probability P.

It should be noted that S is an integer greater than or equal to 1, N is an integer greater than or equal to 0 and less than or equal to S, and M is an integer greater than or equal to 0 and less than or equal to N.

In a preferred embodiment of the present invention, the determining, by the first UE, M resources according to the N available resources includes randomly selecting, by the first UE, the M resources from the N available resources.

In a preferred embodiment of the present invention, before the determining, by first UE, N available resources from S resources, the method further includes obtaining, by the first UE, the resource configuration information or resource preconfiguration information, and obtaining, by the first UE, the resource configuration information, where the resource configuration information includes information about the S resources, and the resource configuration information is configured by the base station or preconfigured.

In a preferred embodiment of the present invention, the determining, by first UE, N available resources from S resources includes detecting, by the first UE, energy or power of a signal carried on each of the S resources, and if the energy or the power of the signal carried on the resource is less than a threshold a, determining that the resource is the available resource, or detecting, by the first UE, a sequence carried on each of the S resources, and if the resource carries no preset sequence, determining that the resource is the available resource.

In a preferred embodiment of the present invention, after the determining, by first UE, N idle resources and available resources from S resources, the method further includes determining, by the first UE, the M resources according to the N available resources after an interval of preset duration T, or redetermining, by the first UE, N available resources from the S resources after an interval of preset duration T.

T is determined according to at least one of a quantity N of available resources, a quantity N–S of unavailable resources, a proportion N/S of the available resources, a quantity c of conflicts of the first UE, a conflict time w, a service priority Q of the first UE, or a priority of the first UE.

In this preferred embodiment, the data sent by the first UE to the at least one UE is new data obtained after original data is discarded, or is the original data. That is, the original data is sent after being delayed for the preset duration T, or the original data is discarded, and new data is sent after the preset duration T.

In a preferred embodiment of the present invention, after the determining, by first UE, N available resources from S resources, the method further includes determining whether the first UE meets a first preset condition, and if the first UE meets the first preset condition, determining, by the first UE, the M resources according to the N available resources, or if the first UE does not meet the first preset condition, after an interval of preset duration T, determining, by the first UE, the M resources according to the N available resources, or redetermining N available resources from the S resources and determining the M resources according to the N available resources.

T is determined according to at least one of a quantity N of available resources, a quantity N–S of unavailable resources, a proportion N/S of the available resources, a quantity c of conflicts of the first UE, a conflict time w, a service priority Q of the first UE, or a priority of the first UE, the first preset condition is $N \geq a$, $N/S \geq b$, $Q \geq Q_0$, the quantity c of conflicts of the first UE is greater than $C_0$, the conflict time w of the first UE is greater than $W_0$, or the service priority Q of the first UE or the priority of the UE is greater than $Q_0$, a is a resource threshold, b is a minimum proportion of the available resources to preset resources, $C_0$ is a threshold of the quantity of conflicts, $W_0$ is a conflict time threshold, and $Q_0$ is a priority threshold, c is an integer greater than or equal to 0, and w is a positive number. c is an integer greater than or equal to 0, w is a positive number, and Q is related to a rule for defining a priority. This is not limited herein. For example, −2, −1, and 0 may be used to indicate that a priority level is from high to low, or 2, 1, and 0 may be used to indicate that a priority level is from high to low.

For example, the threshold a and the threshold b may be values preset according to experience. For example, the threshold a is 5, and the threshold b is 80%.

In this preferred embodiment, the data sent by the first UE to the at least one UE is new data obtained after original data is discarded, or is the original data. That is, the original data is sent after being delayed for the preset duration T, or the original data is discarded, and new data is sent after the preset duration T.

In a preferred embodiment of the present invention, the determining, by the first UE, the M resources according to the N available resources after an interval of preset duration T includes randomly selecting, by the first UE, the M resources from the N available resources, obtaining, by the first UE, L resources according to the N available resources, and randomly selecting, by the first UE, the M resources from the L available resources, or redetermining, by the first UE, N available resources from the S resources, and randomly selecting, by the first UE, the M resources from the redetermined N available resources.

Further, the obtaining, by the first UE, L resources according to the N available resources specifically includes obtaining, by the first UE, the L resources after performing an operation on the N available resources by using a preset rule. For example, the obtaining the L resources after performing an operation on the N available resources by using a preset rule may be obtaining the L resources by means of calculation by using a frequency hopping formula.

In a preferred embodiment of the present invention, the sending, by the first UE, data to at least one second UE by using the M resources includes sending, by the first UE, the data to the at least one second UE on the M resources. That is, the first UE adds to-be-sent data to the M resources and sends the to-be-sent data to the at least one UE.

In a preferred embodiment of the present invention, the sending, by the first UE, data to at least one second UE by using the M resources includes determining, by the first UE, a transmit probability P, and sending the data to the at least one second UE on the M resources according to the transmit probability P, where the transmit probability P is determined according to at least one of a quantity N of available resources, a quantity N–S of unavailable resources, a proportion N/S of the available resources, a quantity c of conflicts of the first UE, a conflict time w, a service priority Q of the first UE, or a priority of the first UE.

For example, if the first UE selects 10 resources from the determined available resources, and the determined transmit probability P is 0.5, the first UE sends the data on the 10 resources according to the probability 50%. From a perspective of statistics, a discovery signal is actually sent once in every two sending opportunities.

In a preferred embodiment of the present invention, the sending, by the first UE, data to at least one second UE by using the M resources includes determining whether the first UE meets a second preset condition, and if the first UE meets the second preset condition, sending, by the first UE, the data to the at least one second UE on the M resources, or if the first UE does not meet the second preset condition, determining, by the first UE, a transmit probability P, and sending the data to the at least one second UE on the M resources according to the transmit probability P.

P is determined according to at least one of a quantity N of available resources, a quantity N−S of unavailable resources, a proportion N/S of the available resources, a quantity c of conflicts of the first UE, a conflict time w, a service priority Q of the first UE, or a priority of the first UE, the second preset condition is N≥a, N/S≥b, Q≥$Q_0$, the quantity c of conflicts of the first UE is greater than $C_0$, the conflict time w of the first UE is greater than $W_0$, or the service priority Q of the first UE or the priority of the UE is greater than $Q_0$, a is a resource threshold, b is a minimum proportion of the available resources to preset resources, $C_0$ is a threshold of the quantity of conflicts, $W_0$ is a conflict time threshold, and $Q_0$ is a priority threshold, c is an integer greater than or equal to 0, and w is a positive number.

It should be noted that the first UE may determine the foregoing preset time T and transmit probability P according to the parameter such as the quantity c of conflicts of the first UE or the conflict time w of the first UE.

Specifically, if the quantity c of conflicts of the first UE is greater than the threshold $C_0$, the conflict time w of the first UE is greater than the threshold $W_0$, or whether the service priority Q of the first UE or the priority of the UE is lower than the threshold $Q_0$, the preset duration T is 0. It should be noted that when the priority of the first UE is relatively high, a wait period of the first UE may be 0. That is, a subsequent step can be performed on a service with a high priority without a wait period. When the quantity c of conflicts and/or the conflict time w are/is greater than corresponding thresholds/a corresponding threshold, the preset duration T is 0. That is, UE that has not obtained a resource for quite a long time may require no wait period.

Alternatively, T=$f(x)$. x is one of N, N−S, N/S, the service priority Q of the first UE, the priority of the UE, a value customized by the first UE (such as a priority level, a random value, a preset value, or a constant value), c, w, or a function g(c, w) of c and w, and different values of x are corresponding to different function relationships represented by $f(x)$. For example, T=$f_1$(N), T=$f_2$(N/S), T=$f_3$(N−S), T=$f_4$(Q), T=$f_5$(c), T=$f_6$(w), or T=$f_7$(c, w). A correspondence between a function and a value of x may be stipulated or predefined in a protocol. The present invention includes, but is not limited to, the following function relationship a simple linear relationship T=ax+b, a modulo relationship T=x mod $N_t$, or a segmentation mapping relationship, where one value of x is corresponding to one value of T that is obtained by means of table lookup, and certainly, a parameter in the function, such as a, b, or $N_t$, is a predefined parameter.

In addition, if the quantity c of conflicts of the first UE is greater than the threshold $C_0$, the conflict time w of the first UE is greater than the threshold $W_0$, or whether the service priority Q of the first UE or the priority of the UE is lower than the threshold $Q_0$, the transmit probability P is 1. It should be noted that when the priority of the first UE is relatively high, the transmit probability of the first UE is 100%. When the quantity c of conflicts and/or the conflict time w are/is greater than corresponding thresholds/a corresponding threshold, the transmit probability is 100%. That is, UE that has not obtained a resource for quite a long time has a transmit probability of 100%.

Alternatively, P=$f(x)$. x is one of N, N−S, N/S, the service priority Q of the first UE, the priority of the UE, a value customized by the first UE, c, w, or a function g(c, w) of c and w, and different values of x are corresponding to different functions represented by $f(x)$. For example, P=$f_1$(N), P=$f_2$(N/S), P=$f_3$(N−S), P=$f_4$(Q), P=$f_5$(c), P=$f_6$(w), or P=$f_7$(c, w). A correspondence between a function and a value of x may be stipulated or predefined in a protocol. The present invention includes, but is not limited to, the following function relationship a simple linear relationship P=ax+b, a modulo relationship P=x mod $N_t$, or a segmentation mapping relationship, where one value of x is corresponding to one value of P that is obtained by means of table lookup, and certainly, a parameter in the function, such as a, b, or $N_t$, is a predefined parameter.

It should be noted that, in this embodiment of the present invention, S is a quantity of UEs in a first group corresponding to the first UE, and N is a quantity of UEs that are in the first group and that send data.

Alternatively, S is a quantity of neighboring UEs of the first UE, N is a quantity of UEs that are in the neighboring UEs of the first UE and that send data, and the neighboring UE of the first UE is UE that can directly communicate with the first UE.

In addition, related parameters such as the thresholds m, n, a, b, $C_0$, and $W_0$ and parameters related to T=$f(x)$ and P=$f(x)$ are parameters configured by the base station when there is network coverage, or parameters preconfigured when there is no network coverage, for example, parameters set at delivery of UE.

According to the resource conflict reducing method provided in this embodiment of the present invention, the first UE determines the N available resources from the S resources, determines the M resources according to the N available resources, and finally sends the data to the at least one second UE by using the M resources. According to an existing D2D technology, UE randomly selects a resource in a preset resource pool to transmit data, and a conflict is caused because different UEs preempt a same resource. According to the method provided in the present invention, each UE detects a preset resource, determines an available resource, and then transmits data according to the determined available resource. This can reduce a probability that the UE competes for a same resource with another UE, and reduce, to some extent, a conflict generated in the D2D technology because transmit UE preempts a resource.

Embodiment 2

Figure 2:
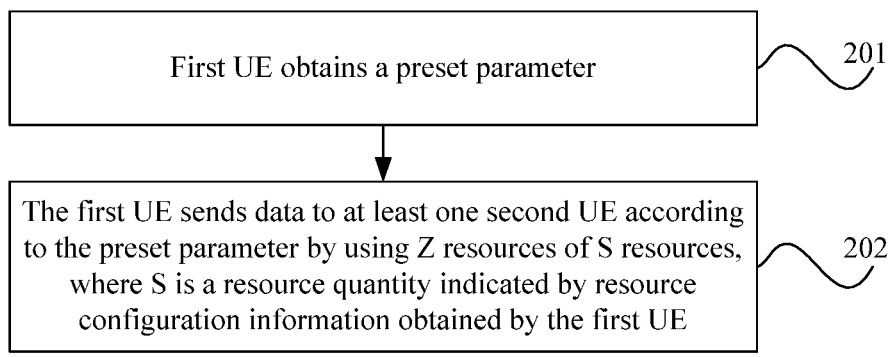
FIG. 2 is a schematic flowchart of a resource conflict reducing method according to Embodiment 2 of the present invention.

This embodiment of the present invention provides a resource conflict reducing method that is executed by UE. As shown in FIG. 2, the method includes the following steps.

201. First UE obtains a preset parameter.

Specifically, the preset parameter is configured by a base station when there is network coverage, or is preconfigured when there is no network coverage.

202. The first UE sends data to at least one second UE according to the preset parameter by using Z resources of S resources, where S is a resource quantity indicated by resource configuration information obtained by the first UE.

The preset parameter is at least one of a quantity c of conflicts of the first UE, a conflict time w of the first UE, a service priority Q of the first UE, or a priority of the UE, and S is an integer greater than or equal to 1, Z is an integer less than or equal to S, c is an integer greater than or equal to 0, and w is a positive number.

It should be noted that the resources are an SA resource, a data resource, and a discovery resource, and the data sent to the at least one second UE is SA, data, and a discovery signal.

Alternatively, the resources are a resource in an SA resource pool, a resource in a data resource pool, and a resource in a discovery resource pool, or are resources that are available for sending SA, data, and a discovery signal in a period of time.

The S resources may be indicated by the resource configuration information sent by the base station. Before step 201, the first UE receives the resource configuration information sent by the base station. In addition, the first UE further needs to obtain at least one of the quantity c of conflicts of the first UE, the conflict time w of the first UE, the service priority Q of the first UE, or the priority of the UE.

In a preferred embodiment of the present invention, the sending data to at least one second UE according to Z resources of S resources includes randomly selecting, by the first UE, the Z resources from the S resources, and sending the data to the at least one second UE by using the Z resources.

In a preferred embodiment of the present invention, before the sending, by the first UE, data to at least one second UE according to the preset parameter by using Z resources of S resources, the method further includes obtaining, by the first UE, the resource configuration information, where the resource configuration information includes information about the S resources.

In a preferred embodiment of the present invention, the sending, by the first UE, data to at least one second UE according to the preset parameter by using S resources includes determining, by the first UE, preset duration T according to the preset parameter, randomly determining, by the first UE, the Z resources from the S resources after an interval of the preset duration T, and sending the data to the at least one second UE on the Z resources.

In this preferred embodiment, the data sent by the first UE to the at least one UE is new data obtained after original data is discarded, or is the original data. That is, the original data is sent after being delayed for the preset duration T, or the original data is discarded, and new data is sent after the preset duration T.

In a preferred embodiment of the present invention, the sending, by the first UE, data to at least one second UE according to the preset parameter by using S resources includes determining whether the quantity c of conflicts of the first UE is less than a threshold $C_0$, whether the conflict time w of the first UE is less than a threshold $W_0$, or whether the service priority Q of the first UE or the priority of the UE is lower than a threshold $Q_0$, and if the quantity c of conflicts of the first UE is less than the threshold $C_0$, the conflict time w of the first UE is less than the threshold $W_0$, or the service priority Q of the first UE or the priority of the UE is lower than the threshold $Q_0$, determining preset duration T according to the preset parameter, randomly determining the Z resources from the S resources at an interval of the preset duration T, and sending the data to the at least one second UE on the Z resources, or if the quantity c of conflicts of the first UE is not less than the threshold $C_0$, the conflict time w of the first UE is not less than the threshold $W_0$, or the service priority Q of the first UE or the priority of the UE is not lower than the threshold $Q_0$, sending the data to the at least one second UE on the Z resources.

In this preferred embodiment, the data sent by the first UE to the at least one UE is new data obtained after original data is discarded, or is the original data. That is, the original data is sent after being delayed for the preset duration T, or the original data is discarded, and new data is sent after the preset duration T.

In a preferred embodiment of the present invention, the sending, by the first UE, data to at least one second UE according to the preset parameter by using S resources includes determining, by the first UE, a transmit probability P according to the preset parameter, and sending the data to the at least one second UE on the Z resources according to the transmit probability P.

In a preferred embodiment of the present invention, the sending, by the first UE, data to at least one second UE according to the preset parameter by using S resources includes randomly determining, by the first UE, the Z resources from the S resources, determining whether the quantity c of conflicts of the first UE is less than a threshold $C_0$, whether the conflict time w of the first UE is less than a threshold $W_0$, or whether the service priority Q of the first UE or the priority of the UE is lower than a threshold $Q_0$, and if the quantity c of conflicts of the first UE is less than the threshold $C_0$, the conflict time w of the first UE is less than the threshold $W_0$, or the service priority Q of the first UE or the priority of the UE is lower than the threshold $Q_0$, determining a transmit probability P according to the preset parameter, and sending the data to the at least one second UE on the Z resources according to the transmit probability P, or if the quantity c of conflicts of the first UE is not less than the threshold $C_0$, the conflict time w of the first UE is not less than the threshold $W_0$, or the service priority Q of the first UE or the priority of the UE is not lower than the threshold $Q_0$, sending the data to the at least one second UE on the Z resources.

In a preferred embodiment of the present invention, the determining preset duration T according to the preset parameter includes when the quantity c of conflicts of the first UE is greater than the threshold $C_0$, the conflict time w of the first UE is greater than the threshold $W_0$, or the service priority Q of the first UE or the priority of the UE is higher than the threshold $Q_0$, determining that the preset duration T is 0. It should be noted that when the priority of the first UE is relatively high, a wait period of the first UE may be 0. That is, a subsequent step can be performed on a service with a high priority without a wait period. When the quantity c of conflicts and/or the conflict time w are/is greater than corresponding thresholds/a corresponding threshold, the preset duration T is 0. That is, UE that has not obtained a resource for quite a long time may require no wait period.

Alternatively, the preset duration T is determined to be $T=f(x)$. x is one of N, N−S, N/S, the service priority Q of the first UE, a value customized by the first UE, c, w, or a function g(c, w) of c and w, and different values of x are corresponding to different function relationships represented by $f(x)$. For example, $T=f_1(N)$, $T=f_2(N/S)$, $T=f_3(N-S)$, $T=f_4(Q)$, $T=f_5(c)$, $T=f_6(w)$, or $T=f_7(c, w)$. A correspondence between a function and a value of x may be stipulated or predefined in a protocol. The present invention includes, but is not limited to, the following function relationship a simple linear relationship $T=ax+b$, a modulo relationship $T=x \bmod N_f$, or a segmentation mapping relationship, where one value of x is corresponding to one value of T that is obtained by means of table lookup, and certainly, a parameter in the function, such as a, b, or $N_f$, is a predefined parameter.

In a preferred embodiment of the present invention, the determining a transmit probability P according to the preset parameter includes when the quantity c of conflicts of the first UE is greater than the threshold $C_0$, the conflict time w of the first UE is greater than the threshold $W_0$, or the service priority Q of the first UE or the priority of the UE is higher than the threshold $Q_0$, determining that the transmit probability P is 1. It should be noted that when the priority of the first UE is relatively high, the transmit probability of the first UE is 100%. When the quantity c of conflicts and/or the conflict time w are/is greater than corresponding thresholds/a corresponding threshold, the transmit probability is 100%. That is, UE that has not obtained a resource for quite a long time has a transmit probability of 100%.

Alternatively, the transmit probability P is determined to be P=$f$(x). x is one of N, N−S, N/S, the service priority Q of the first UE, a value customized by the first UE, c, w, or a function g(c, w) of c and w, and different values of x are corresponding to different function relationships represented by $f$(x). For example, P=$f_1$(N), P=$f_2$(N/S), P=$f_3$(N−S), P=$f_4$(Q), P=$f_5$(c), P=$f_6$(c, w). A correspondence between a function and a value of x may be stipulated or predefined in a protocol. The present invention includes, but is not limited to, the following function relationship a simple linear relationship P=ax+b, a modulo relationship P=x mod $N_t$, or a segmentation mapping relationship, where one value of x is corresponding to one value of P that is obtained by means of table lookup, and certainly, a parameter in the function, such as a, b, or $N_t$, is a predefined parameter.

In addition, related parameters such as the thresholds a, b, $C_0$, and $W_0$ and parameters related to T=$f$(x) and P=$f$(x) are parameters configured by the base station when there is network coverage, or parameters preconfigured when there is no network coverage, for example, parameters set at delivery of UE.

According to the resource conflict reducing method provided in this embodiment of the present invention, when the first UE needs to transmit data, the first UE sends the data to the at least one second UE according to the preset parameter by using the Z resources of the S resources. The preset parameter is at least one of the quantity c of conflicts of the first UE, the conflict time w of the first UE, the service priority Q of the first UE, or the priority of the UE. According to an existing D2D technology, UE randomly selects a resource in a preset resource pool to transmit data, and a conflict is caused because different UEs preempt a same resource. According to the method provided in the present invention, the UE determines the transmit probability or the wait period with reference to a parameter such as the quantity of conflicts of the UE, the conflict time of the UE, or the service priority of the UE. Different UEs are corresponding to different wait periods or transmit probabilities. This can avoid, to some extent, that the UE competes for a same resource with another UE, and effectively reduce a conflict generated in the D2D technology because transmit UE preempts a resource.

Embodiment 3

Figure 3:
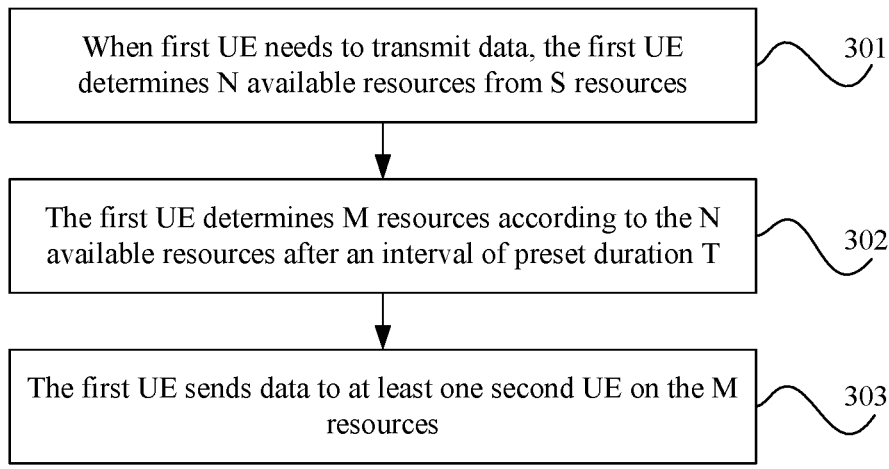
FIG. 3 is a schematic flowchart of a resource conflict reducing method according to Embodiment 3 of the present invention.

This embodiment of the present invention provides a resource conflict reducing method. As shown in FIG. 3, the method includes the following steps.

301. When first UE needs to transmit data, the first UE determines N available resources from S resources.

S is a resource quantity indicated by resource configuration information obtained by the first UE.

Specifically, the determining, by the first UE, N available resources from S resources includes detecting, by the first UE, energy or power of a signal carried on each of the S resources, and if the energy of the signal carried on the resource is less than a threshold m or the power of the signal carried on the resource is less than a threshold n, determining that the resource is the available resource, or detecting, by the first UE, a sequence carried on each of the S resources, and if the resource carries no preset sequence, determining that the resource is the available resource.

Herein, the power is obtained by dividing the energy by a detection time. That is, the power may be a value corresponding to a moment, and the energy needs to be a value corresponding to a period of time.

302. The first UE determines M resources according to the N available resources after an interval of preset duration T.

The preset duration T includes if a quantity c of conflicts of the first UE is greater than a threshold $C_0$ or a conflict time w of the first UE is greater than a threshold $W_0$, the preset duration T is 0.

Alternatively, T=$f$(x). x is one of N, N−S, N/S, a service priority Q of the first UE, a priority of the UE, a value customized by the first UE, c, w, or a function g(c, w) of c and w, and different values of x are corresponding to different function relationships represented by $f$(x). Fore example, T=$f_1$(N), T=$f_2$(N/S), T=$f_3$(N−S), T=$f_4$(Q), T=$f_5$(c), T=$f_6$(w) or T=$f_7$(c, w). A correspondence between a function and a value of x may be stipulated or predefined in a protocol. The present invention includes, but is not limited to, the following function relationship a simple linear relationship T=ax+b, a modulo relationship T=x mod $N_t$, or a segmentation mapping relationship, where one value of x is corresponding to one value of T that is obtained by means of table lookup, and certainly, a parameter in the function, such as a, b, or $N_t$, is a predefined parameter.

The determining M resources according to the N available resources includes randomly selecting, by the first UE, the M resources from the N available resources, obtaining, by the first UE, L resources according to the N available resources, and randomly selecting, by the first UE, the M resources from the L available resources, or redetermining, by the first UE, N available resources from the S resources, and randomly selecting, by the first UE, the M resources from the redetermined N available resources.

303. The first UE sends data to at least one second UE on the M resources.

Figure 4:
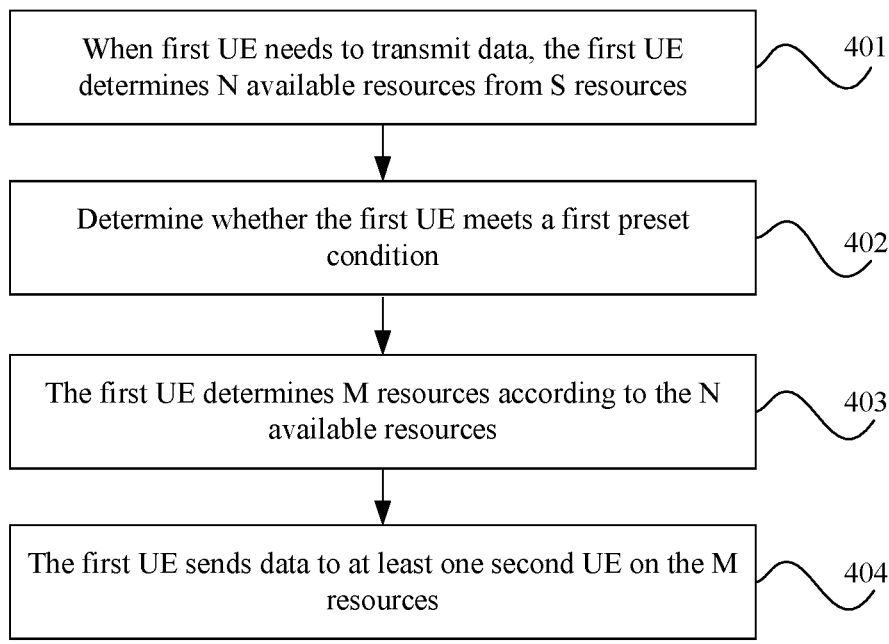
FIG. 4 is a schematic flowchart of another resource conflict reducing method according to Embodiment 3 of the present invention.

This embodiment of the present invention provides a resource conflict reducing method. As shown in FIG. 4, the method includes the following steps.

401. When first UE needs to transmit data, the first UE determines N available resources from S resources.

402. Determine whether the first UE meets a first preset condition.

The first preset condition is N≥a, N/S≥b, Q≥$Q_0$, a quantity c of conflicts of the first UE is greater than $C_0$, a conflict time w of the first UE is greater than $W_0$, or a service priority Q of the first UE or a priority of the UE is higher than $Q_0$, a is a resource threshold, b is a minimum proportion of available resources to preset resources, $C_0$ is a threshold of the quantity of conflicts, $W_0$ is a conflict time threshold, and $Q_0$ is a priority threshold, c is an integer greater than or equal to 0, and w is a positive number. That is, the first preset condition is that N is greater than or equal to the threshold a, N/S is greater than or equal to the threshold b, the quantity c of conflicts is greater than the threshold $C_0$, the conflict time w of the first UE is greater than the threshold $W_0$, or the service priority Q of the first UE or the priority of the UE is higher than the threshold $Q_0$.

If the first UE meets the first preset condition, step 403 is performed, or if the first UE does not meet the first preset condition, step 403 is performed after an interval of preset duration T.

403. The first UE determines M resources according to the N available resources.

404. The first UE sends data to at least one second UE on the M resources.

Figure 5:
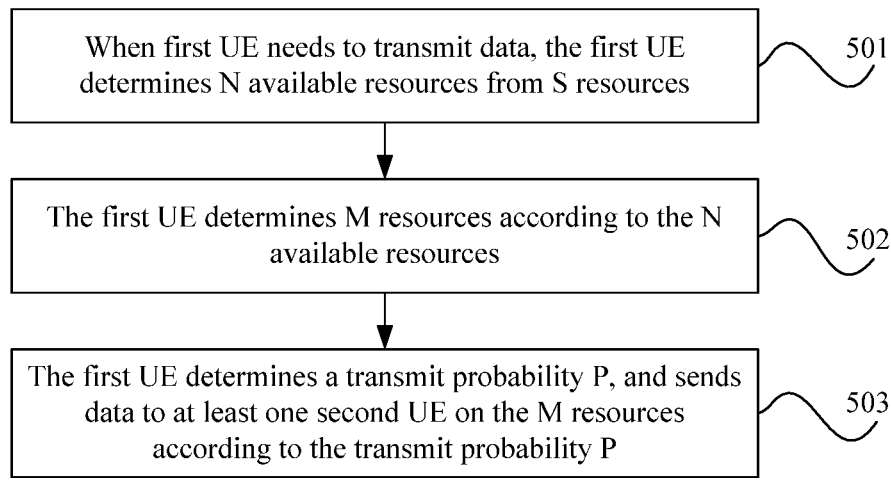
FIG. 5 is a schematic flowchart of another resource conflict reducing method according to Embodiment 3 of the present invention.

This embodiment of the present invention further provides a resource conflict reducing method. As shown in FIG. 5, the method includes the following steps.

501. When first UE needs to transmit data, the first UE determines N available resources from S resources.

502. The first UE determines M resources according to the N available resources.

503. The first UE determines a transmit probability P, and sends data to at least one second UE on the M resources according to the transmit probability P.

If a quantity c of conflicts of the first UE is greater than a threshold $C_0$, a conflict time w of the first UE is greater than a threshold $W_0$, or whether a service priority Q of the first UE or a priority of the UE is less than a threshold $Q_0$, the transmit probability P is 1. It should be noted that when the priority of the first UE is relatively high, the transmit probability of the first UE is 100%. When the quantity c of conflicts and/or the conflict time w are/is greater than corresponding thresholds/a corresponding threshold, the transmit probability is 100%. That is, UE that has not obtained a resource for quite a long time has a transmit probability of 100%.

Alternatively, P=$f$(x). x is one of N, N−S, N/S, a service priority Q of the first UE, a priority of the UE, a value customized by the first UE, c, w, or a function g(c, w) of c and w, and different values of x are corresponding to different function relationships represented by $f$(x). For example, P=$f_1$(N), P=$f_2$(N/S), P=$f_3$(N−S), P=$f_4$(Q), P=$f_5$(c), P=$f_6$(w), or P=$f_7$(c, w). A correspondence between a function and a value of x may be stipulated or predefined in a protocol. The present invention includes, but is not limited to, the following function relationship, including a simple linear relationship P=ax+b, a modulo relationship P=x mod $N_t$, or a segmentation mapping relationship, where one value of x is corresponding to one value of P that is obtained by means of table lookup, and certainly, a parameter in the function, such as a, b, or $N_t$, is a predefined parameter.

Figure 6:
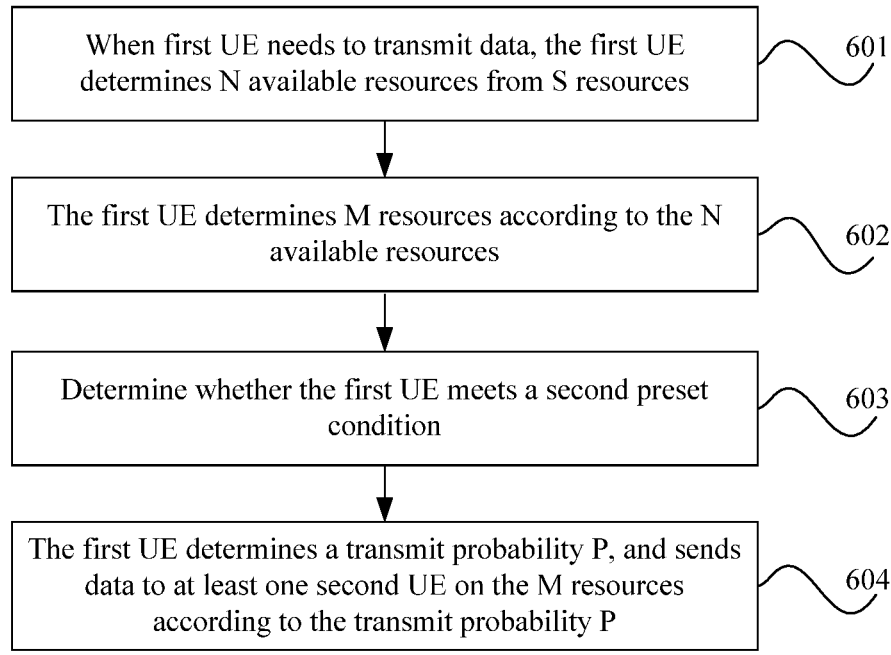
FIG. 6 is a schematic flowchart of another resource conflict reducing method according to Embodiment 3 of the present invention.

This embodiment of the present invention further provides a resource conflict reducing method. As shown in FIG. 6, the method includes the following steps.

601. When first UE needs to transmit data, the first UE determines N available resources from S resources.

602. The first UE determines M resources according to the N available resources.

603. Determine whether the first UE meets a second preset condition.

The second preset condition is N≥a, N/S≥b, Q≥$Q_0$, a quantity c of conflicts of the first UE is greater than $C_0$, a conflict time w of the first UE is greater than $W_0$, or a service priority Q of the first UE or a priority of the UE is higher than $Q_0$, a is a resource threshold, b is a minimum proportion of available resources to preset resources, $C_0$ is a threshold of the quantity of conflicts, $W_0$ is a conflict time threshold, and $Q_0$ is a priority threshold, c is an integer greater than or equal to 0, and w is a positive number. That is, the second preset condition is that N is greater than or equal to the threshold a, N/S is greater than or equal to the threshold b, the quantity c of conflicts is greater than the threshold $C_0$, the conflict time w of the first UE is greater than the threshold $W_0$, or the service priority Q of the first UE or the priority of the UE is higher than the threshold $Q_0$.

If the first UE meets the second preset condition, step 604 is performed, or if the first UE does not meet the second preset condition, step 604 is performed after an interval of preset duration T.

604. The first UE determines a transmit probability P, and sends data to at least one second UE on the M resources according to the transmit probability P.

Figure 7:
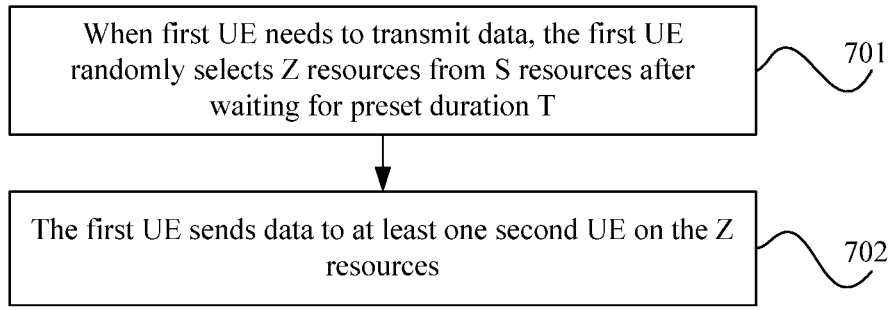
FIG. 7 is a schematic flowchart of another resource conflict reducing method according to Embodiment 3 of the present invention.

This embodiment of the present invention further provides a resource conflict reducing method. As shown in FIG. 7, the method includes the following steps.

701. When first UE needs to transmit data, the first UE randomly selects Z resources from S resources after waiting for preset duration T.

The preset duration T is determined according to a preset parameter. S is a resource quantity indicated by resource configuration information obtained by the first UE. The preset parameter is at least one of a quantity c of conflicts of the first UE, a conflict time w of the first UE, a service priority Q of the first UE, or a priority of the UE.

702. The first UE sends data to at least one second UE on the Z resources.

Certainly, before step 701, the first UE further needs to obtain the preset parameter such as the quantity c of conflicts of the first UE and/or the conflict time w of the first UE.

Figure 8:
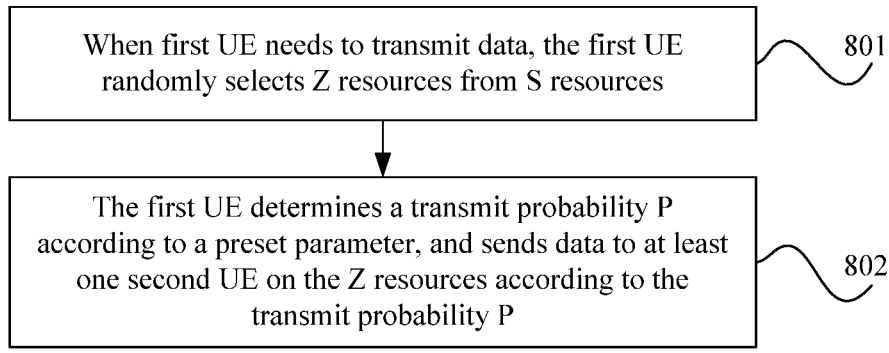
FIG. 8 is a schematic flowchart of another resource conflict reducing method according to Embodiment 3 of the present invention.

This embodiment of the present invention further provides a resource conflict reducing method. As shown in FIG. 8, the method includes the following steps.

801. When first UE needs to transmit data, the first UE randomly selects Z resources from S resources.

802. The first UE determines a transmit probability P according to a preset parameter, and sends data to at least one second UE on the Z resources according to the transmit probability P.

Certainly, before step 801, the first UE further needs to obtain the preset parameter such as a quantity c of conflicts of the first UE and/or a conflict time w of the first UE.

Figure 9:
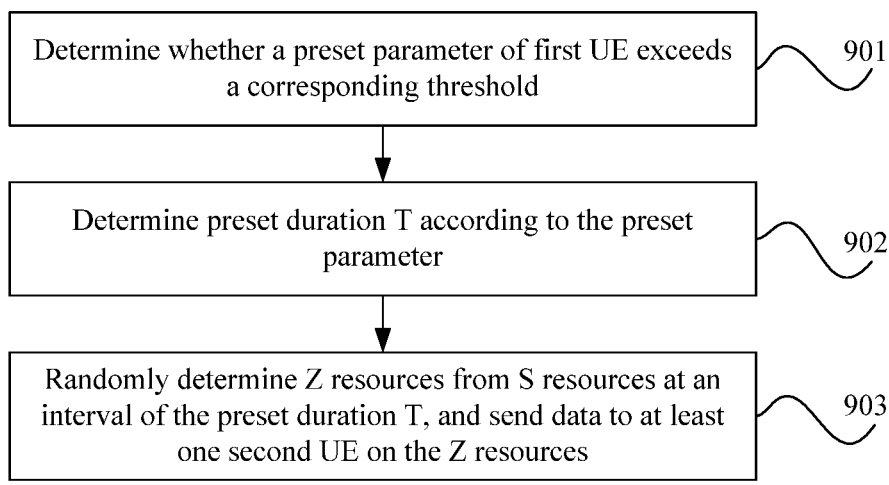
FIG. 9 is a schematic flowchart of another resource conflict reducing method according to Embodiment 3 of the present invention.

This embodiment of the present invention further provides a resource conflict reducing method. As shown in FIG. 9, the method includes the following steps.

901. Determine whether a preset parameter of first UE exceeds a corresponding threshold.

Specifically, it is determined whether a quantity c of conflicts of the first UE is less than a threshold $C_0$ or whether a conflict time w of the first UE is less than a threshold $W_0$.

If the preset parameter of the first UE exceeds the corresponding threshold, that is, the quantity c of conflicts of the first UE is less than the threshold $C_0$ or the conflict time w of the first UE is less than the threshold $W_0$, step 902 is performed, or if the preset parameter of the first UE does not exceed the corresponding threshold, Z resources are randomly determined from S resources, and data is sent to at least one second UE on the Z resources.

902. Determine preset duration T according to the preset parameter.

The determining preset duration T according to the preset parameter includes when the quantity c of conflicts of the first UE is greater than the threshold $C_0$ or the conflict time w of the first UE is greater than the threshold $W_0$, determining that the preset duration T is 0, or determining that the preset duration T is T=$f$(x), where x is one of N, N−S, N/S, a service priority Q of the first UE, a value customized by the first UE, c, w, or a function g(c, w) of c and w, and different values of x are corresponding to different function relationships represented by $f$(x).

903. Randomly determine Z resources from S resources at an interval of the preset duration T, and send data to at least one second UE on the Z resources.

Certainly, before step 901, the first UE further needs to obtain the preset parameter such as the quantity c of conflicts of the first UE and/or the conflict time w of the first UE.

Figure 10:
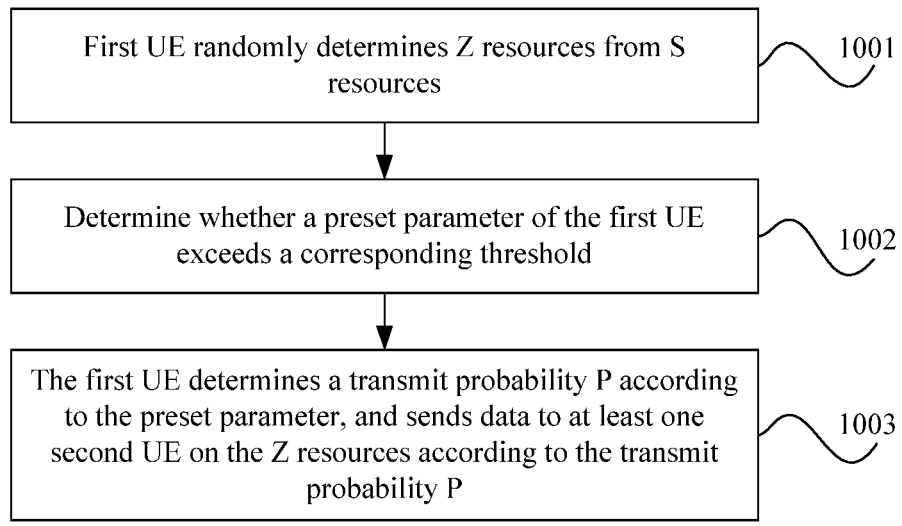
FIG. 10 is a schematic flowchart of another resource conflict reducing method according to Embodiment 3 of the present invention.

This embodiment of the present invention further provides a resource conflict reducing method. As shown in FIG. 10, the method includes the following steps.

1001. First UE randomly determines Z resources from S resources.

1002. Determine whether a preset parameter of the first UE exceeds a corresponding threshold.

Specifically, it is determined whether a quantity c of conflicts of the first UE is less than a threshold $C_0$ or whether a conflict time w of the first UE is less than a threshold $W_0$.

If the preset parameter of the first UE does not exceed the corresponding threshold, that is, the quantity c of conflicts of the first UE is less than the threshold $C_0$ or the conflict time w of the first UE is less than the threshold $W_0$, step 1003 is performed.

1003. The first UE determines a transmit probability P according to the preset parameter, and sends data to at least one second UE on the Z resources according to the transmit probability P.

The determining a transmit probability P according to the preset parameter includes when the quantity c of conflicts of the first UE is greater than the threshold $C_0$ or the conflict time w of the first UE is greater than the threshold $W_0$, determining that the transmit probability P is 1, or determining that the transmit probability P is P=$f(x)$, where x is one of N, N−S, N/S, a service priority Q of the first UE, a value customized by the first UE, c, w, or a function g(c, w) of c and w, and different values of x are corresponding to different function relationships represented by $f(x)$.

Certainly, before step 1001, the first UE further needs to obtain the preset parameter such as the quantity c of conflicts of the first UE and/or the conflict time w of the first UE.

Embodiment 4

Figure 11:
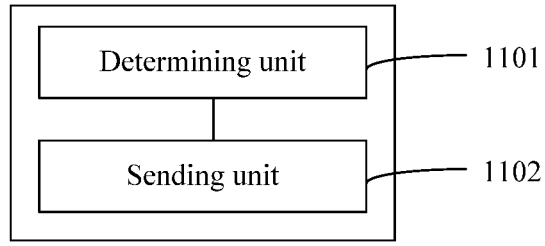
FIG. 11 is a structural block diagram of UE according to Embodiment 4 of the present invention.

This embodiment of the present invention provides UE 11. As shown in FIG. 11, the UE 11 includes a determining unit 1101 and a sending unit 1102.

The determining unit 1101 is configured to determine N available resources from S resources, where S is a resource quantity indicated by resource configuration information obtained by the first UE.

For the UE, an available resource indicates that energy of a signal carried on the resource is less than a threshold m or power of the signal carried on the resource is less than a threshold n or that the resource carries no preset sequence. When the energy of the signal carried on the resource is quite low, the signal may be considered as a noise signal. Alternatively, if a sequence on the resource is not a sequence of a system, such as an LTE system or a Wi-Fi system, known to the UE, the resource is considered as the available resource.

The determining unit 1101 is further configured to determine M resources according to the N available resources.

The sending unit 1102 is configured to send data to at least one second UE by using the M resources.

The determining unit 1101 is specifically configured to randomly select the M resources from the N available resources.

An obtaining unit is further included. The obtaining unit is configured to obtain the resource configuration information or resource preconfiguration information. The resource configuration information or the resource preconfiguration information includes information about the S resources.

The determining unit 1101 is specifically configured to detect energy or power of a signal carried on each of the S resources, and if the energy of the signal carried on the resource is less than the threshold m or the power of the signal carried on the resource is less than the threshold n, determine that the resource is the available resource, or detect a sequence carried on each of the S resources, and if the resource carries no preset sequence, determine that the resource is the available resource.

The determining unit 1101 is specifically configured to after determining the N idle resources and available resources from the S resources, determine the M resources according to the N available resources after an interval of preset duration T, or redetermine N available resources from the S resources after an interval of preset duration T.

The determining unit 1101 is specifically configured to after determining the N available resources from the S resources, determine whether the first UE meets a first preset condition, and if the first UE meets the first preset condition, determine the M resources according to the N first time-frequency resources, or if the first UE does not meet the first preset condition, determine the M resources according to the N available resources after an interval of preset duration T.

The first preset condition is N≥a, N/S≥b, Q≥$Q_0$, a quantity c of conflicts of the first UE is greater than $C_0$, a conflict time w of the first UE is greater than $W_0$, or a service priority Q of the first UE or a priority of the UE is higher than $Q_0$, a is a resource threshold, b is a minimum proportion of available resources to preset resources, $C_0$ is a threshold of the quantity of conflicts, $W_0$ is a conflict time threshold, and $Q_0$ is a priority threshold, c is an integer greater than or equal to 0, and w is a positive number.

Further, that the determining unit determines the M resources according to the N available resources after an interval of preset duration T includes randomly selecting the M resources from the N available resources, or obtaining L resources according to the N available resources, and randomly selecting, by the first UE, the M resources from the L available resources.

Further, that the determining unit obtains L resources according to the N available resources specifically includes obtaining the L resources after performing an operation on the N available resources by using a preset rule.

The data sent by the sending unit 1102 to the at least one UE is new data obtained after original data is discarded, or is the original data.

The preset duration T may be determined in the following manner.

If the quantity c of conflicts of the first UE is greater than the threshold $C_0$, the conflict time w of the first UE is greater than the threshold $W_0$, or the service priority Q of the first UE or the priority of the UE is higher than the threshold $Q_0$, the preset duration T is 0, or T=$f(x)$, where x is one of N, N−S, N/S, the service priority Q of the first UE, the priority of the UE, a value customized by the first UE, c, w, or a function g(c, w) of c and w, and different values of x are corresponding to different function relationships represented by $f(x)$. For example, T=$f_1(N)$, T=$f_2(N/S)$, T=$f_3(N-S)$, T=$f_4(Q)$, T=$f_5(c)$, T=$f_6(w)$, or T=$f_7(c, w)$. A correspondence between a function and a value of x may be stipulated or predefined in a protocol. The present invention includes, but is not limited to, the following function relationship, where a simple linear relationship T=ax+b, a modulo relationship T=x mod $N_t$, or a segmentation mapping relationship, where one value of x is corresponding to one value of T that is obtained by means of table lookup, and certainly, a parameter in the function, such as a, b, or $N_f$, is a predefined parameter.

The sending unit 1102 is specifically configured to send the data to the at least one second UE on the M resources.

The determining unit 1101 is further configured to determine a transmit probability P.

The sending unit 1102 is specifically configured to send the data to the at least one second UE on the M resources according to the transmit probability P.

The UE further includes a judging unit. The judging unit is configured to determine whether the first UE meets a second preset condition.

If the judging unit determines that the first UE meets the second preset condition, the sending unit sends the data to the at least one second UE on the M resources.

If the judging unit determines that the first UE does not meet the second preset condition, the determining unit 1101 determines a transmit probability P, and the sending unit 1102 sends the data to the at least one second UE on the M resources according to the transmit probability P.

The second preset condition is $N \geq a$, $N/S \geq b$, $Q \geq Q_0$, a quantity c of conflicts of the first UE is greater than $C_0$, a conflict time w of the first UE is greater than $W_0$, or a service priority Q of the first UE or a priority of the UE is higher than $Q_0$, a is a resource threshold, b is a minimum proportion of available resources to preset resources, $C_0$ is a threshold of the quantity of conflicts, $W_0$ is a conflict time threshold, and $Q_0$ is a priority threshold, c is an integer greater than or equal to 0, and w is a positive number.

The transmit probability P may be determined in the following manner.

If the quantity c of conflicts of the first UE is greater than the threshold $C_0$, the conflict time w of the first UE is greater than the threshold $W_0$, or the service priority Q of the first UE or the priority of the UE is higher than the threshold $Q_0$, the transmit probability P is 1, or $P=f(x)$, where x is one of N, N–S, N/S, the service priority Q of the first UE, the priority of the UE, a value customized by the first UE, c, w, or a function g(c, w) of c and w, and different values of x are corresponding to different function relationships represented by $f(x)$. For example, $P=f_1(N)$, $P=f_2(N/S)$, $P=f_3(N-S)$, $P=f_4(Q)$, $P=f_5(c)$, $P=f_6(w)$, or $P=f_7(c, w)$ A correspondence between a function and a value of x may be stipulated or predefined in a protocol. The present invention includes, but is not limited to, the following function relationship, including a simple linear relationship P=ax+b, a modulo relationship $P=x \bmod N_f$, or a segmentation mapping relationship, where one value of x is corresponding to one value of P that is obtained by means of table lookup, and certainly, a parameter in the function, such as a, b, or $N_f$, is a predefined parameter.

It should be noted that S is a quantity of UEs in a first group corresponding to the first UE, and N is a quantity of UEs that are in the first group and that send data.

Alternatively, S is a quantity of neighboring UEs of the first UE, N is a quantity of UEs that are in the neighboring UEs of the first UE and that send data, and the neighboring UE of the first UE is UE that can directly communicate with the first UE.

In addition, the resource is at least one of a scheduling assignment SA resource, a service data resource, or a discovery resource, and the data sent to the at least one second UE is at least one of SA, service data, or a discovery signal.

Alternatively, the resource is at least one of a resource in an SA resource pool, a resource in a service data resource pool, or a resource in a discovery resource pool, or is a resource that is available for sending at least one of SA, service data, or a discovery signal in a period of time.

The UE provided in this embodiment of the present invention determines the N available resources from the S resources, determines the M resources according to the N available resources, and finally sends the data to the at least one second UE by using the M resources. According to an existing D2D technology, UE randomly selects a resource in a preset resource pool to transmit data, and a conflict is caused because different UEs preempt a same resource. Each UE detects a preset resource, determines an available resource, and then transmits data according to the determined available resource. This can reduce a probability that the UE competes for a same resource with another UE, and reduce, to some extent, a conflict generated in the D2D technology because transmit UE preempts a resource.

Embodiment 5

Figure 12:
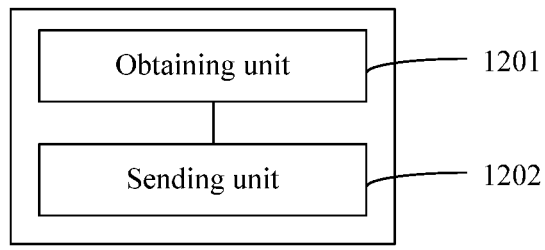
FIG. 12 is a structural block diagram of UE according to Embodiment 5 of the present invention.

This embodiment of the present invention provides UE 12. As shown in FIG. 12, the UE 12 includes an obtaining unit 1201 and a sending unit 1202.

The obtaining unit 1201 is configured to obtain a preset parameter.

The sending unit 1202 is configured to send data to at least one second UE according to the preset parameter by using Z resources of S resources. S is a resource quantity indicated by resource configuration information obtained by the first UE.

The preset parameter is at least one of a quantity c of conflicts of the first UE, a conflict time w of the first UE, a service priority Q of the first UE, or a priority of the UE.

The obtaining unit 1201 is configured to obtain the resource configuration information. The resource configuration information includes information about the S resources, and the resource configuration information is configured by a base station or preconfigured.

Figure 12A:
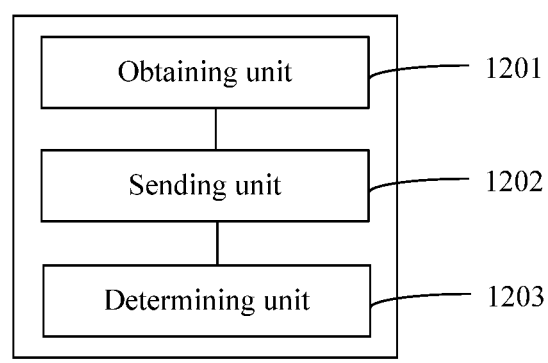
FIG. 12a is another structural block diagram of UE according to Embodiment 5 of the present invention.

As shown in FIG. 12*a*, the UE 12 further includes a determining unit 1203.

The determining unit 1203 is configured to determine preset duration T according to the preset parameter, and randomly determine the Z resources from the S resources after an interval of the preset duration T.

The sending unit 1202 is configured to send the data to the at least one second UE on the Z resources.

It should be noted that the data sent by the first UE to the at least one second UE on the Z resources is new data obtained after original data is discarded, or is the original data.

Figure 12B:
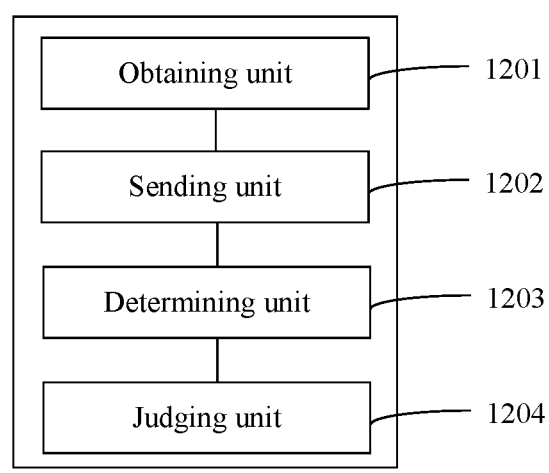
FIG. 12b is another structural block diagram of UE according to Embodiment 5 of the present invention.

As shown in FIG. 12*b*, the UE 12 further includes a judging unit 1204.

The judging unit 1204 is configured to determine whether the quantity c of conflicts of the first UE is less than a threshold $C_0$, whether the conflict time w of the first UE is less than a threshold $W_0$, or whether the service priority Q of the first UE or the priority of the UE is lower than a threshold $Q_0$.

The determining unit 1203 is configured to if the quantity c of conflicts of the first UE is less than the threshold $C_0$, the conflict time w of the first UE is less than the threshold $W_0$, or the service priority Q of the first UE or the priority of the UE is lower than the threshold $Q_0$, determine preset duration T according to the preset parameter, and randomly determine the Z resources from the S resources at an interval of the preset duration T. The sending unit 1202 is configured to send the data to the at least one second UE on the Z resources.

The sending unit 1202 is further configured to if the quantity c of conflicts of the first UE is not less than the threshold $C_0$, the conflict time w of the first UE is not less than the threshold $W_0$, or the service priority Q of the first UE or the priority of the UE is not lower than the threshold $Q_0$, send the data to the at least one second UE on the Z resources.

The determining preset duration T according to the preset parameter includes when the quantity c of conflicts of the first UE is greater than the threshold $C_0$ or the conflict time w of the first UE is greater than the threshold $W_0$, determining that the preset duration T is 0, or determining that the preset duration T is $T=f(x)$, where x is one of N, N–S, N/S, the service priority Q of the first UE, a value customized by the first UE, c, w, or a function g(c, w) of c and w, and different values of x are corresponding to different function relationships represented by $f(x)$. For example, $T=f_1(N)$, $T=f_2(NS)$, $T=f_3(N-S)$, $T=f_4(Q)$, $T=f_5(c)$, $T=f_6(w)$, or $T=f_7(c, w)$. A correspondence between a function and a value of x may be stipulated or predefined in a protocol. The present invention includes, but is not limited to, the following function relationship, including a simple linear relationship $T=ax+b$, a modulo relationship $T=x \bmod N_f$, or a segmentation mapping relationship, where one value of x is corresponding to one value of T that is obtained by means of table lookup, and certainly, a parameter in the function, such as a, b, or $N_f$, is a predefined parameter.

The determining unit 1203 is configured to determine a transmit probability P according to the preset parameter.

The sending unit 1202 is configured to send the data to the at least one second UE on the Z resources according to the transmit probability P.

The determining unit 1203 is configured to randomly determine the Z resources from the S resources.

The judging unit 1204 is configured to determine whether the quantity c of conflicts of the first UE is less than a threshold $C_0$, whether the conflict time w of the first UE is less than a threshold $W_0$, or whether the service priority Q of the first UE or the priority of the UE is lower than a threshold $Q_0$.

The determining unit 1203 is configured to if the quantity c of conflicts of the first UE is less than the threshold $C_0$, the conflict time w of the first UE is less than the threshold $W_0$, or the service priority Q of the first UE or the priority of the UE is lower than the threshold $Q_0$, determine a transmit probability P according to the preset parameter. The sending unit 1202 is configured to send the data to the at least one second UE on the Z resources according to the transmit probability P.

The sending unit is further configured to if the quantity c of conflicts of the first UE is not less than the threshold $C_0$, the conflict time w of the first UE is not less than the threshold $W_0$, or the service priority Q of the first UE or the priority of the UE is not lower than the threshold $Q_0$, send the data to the at least one second UE on the Z resources.

In specific implementation, the determining a transmit probability P according to the preset parameter includes when the quantity c of conflicts of the first UE is greater than the threshold $C_0$ or the conflict time w of the first UE is greater than the threshold $W_0$, determining that the transmit probability P is 1, or determining that the transmit probability P is $P=f(x)$, where x is one of N, N–S, N/S, the service priority Q of the first UE, a value customized by the first UE, c, w, or a function g(c, w) of c and w, and different values of x are corresponding to different function relationships represented by $f(x)$.

According to the UE provided in this embodiment of the present invention, the first UE sends the data to the at least one second UE according to the preset parameter by using the Z resources of the S resources. The preset parameter is at least one of the quantity c of conflicts of the first UE, the conflict time w of the first UE, the service priority Q of the first UE, or the priority of the UE. According to an existing D2D technology, UE randomly selects a resource in a preset resource pool to transmit data, and a conflict is caused because different UEs preempt a same resource. The UE determines the transmit probability or a wait period with reference to a parameter such as the quantity of conflicts of the UE, the conflict time of the UE, or the service priority of the UE. Different UEs are corresponding to different wait periods or transmit probabilities. This can avoid, to some extent, that the UE competes for a same resource with another UE, and effectively reduce a conflict generated in the D2D technology because transmit UE preempts a resource.

Embodiment 6

Figure 13:
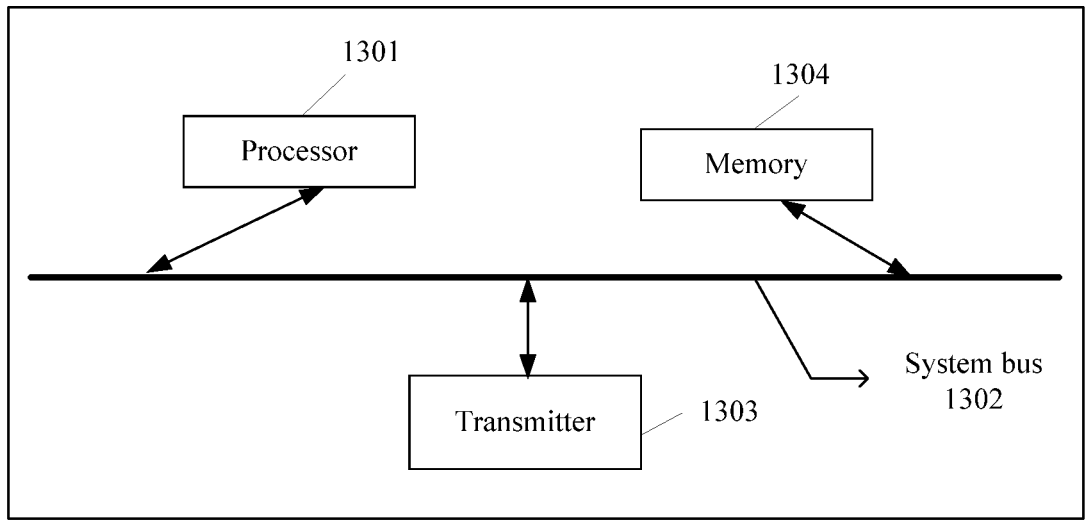
FIG. 13 is a structural block diagram of UE according to Embodiment 6 of the present invention.

This embodiment of the present invention provides UE. As shown in FIG. 13, the UE includes a processor 1301, a system bus 1302, a transmitter 1303, and a memory 1304.

The processor 1301 may be a central processing unit (CPU).

The memory 1304 is configured to store program code, and transmit the program code to the processor 1301. The processor 1301 executes the following instruction according to the program code. The memory 1304 may include a volatile memory (volatile memory), for example, a random access memory (RAM). The memory 1304 may also include a non-volatile memory, for example, a read-only memory (ROM), a flash memory, a hard disk drive (HDD), or a solid state drive (SSD). The memory 1304 may further include a combination of the foregoing types of memories. The processor 1301, the memory 1304, and the transmitter 1303 are connected and communicate with each other by using the system bus 1302.

The transmitter 1303 may be implemented by an optical transceiver, an electrical transceiver, a wireless transceiver, or any combination thereof. For example, the optical transceiver may be a small form-factor pluggable (SFP) transceiver, an enhanced small form-factor pluggable (SFP+) transceiver, or a 10 gigabit small form-factor pluggable (XFP) transceiver. The electrical transceiver may be an Ethernet network interface controller (NIC). The wireless transceiver may be a wireless network interface controller (WNIC). The UE may have multiple transmitters 1303.

The processor 1301 is configured to determine N available resources from S resources, where S is a resource quantity indicated by resource configuration information obtained by the first UE, and determine M resources according to the N available resources.

For the UE, an available resource indicates that energy of a signal carried on the resource is less than a threshold m or power of the signal carried on the resource is less than a threshold n or that the resource carries no preset sequence. When the energy of the signal carried on the resource is quite low, the signal may be considered as a noise signal. Alternatively, if a sequence on the resource is not a sequence of a system, such as an LTE system or a Wi-Fi system, known to the UE, the resource is considered as the available resource.

The transmitter 1303 is configured to send data to at least one second UE by using the M resources.

The processor 1301 is specifically configured to randomly select the M resources from the N available resources.

The processor 1301 is configured to obtain the resource configuration information or resource preconfiguration information. The resource configuration information or the resource preconfiguration information includes information about the S resources.

The processor 1301 is specifically configured to detect energy or power of a signal carried on each of the S resources, and if the energy of the signal carried on the resource is less than the threshold m or the power of the signal carried on the resource is less than the threshold n, determine that the resource is the available resource, or detect a sequence carried on each of the S resources, and if the resource carries no preset sequence, determine that the resource is the available resource.

The processor 1301 is specifically configured to after determining the N idle resources and available resources from the S resources, determine the M resources according to the N available resources after an interval of preset duration T, or redetermine N available resources from the S resources after an interval of preset duration T.

The processor 1301 is specifically configured to after determining the N available resources from the S resources, determine whether the first UE meets a first preset condition, and if the first UE meets the first preset condition, determine the M resources according to the N first time-frequency resources, or if the first UE does not meet the first preset condition, determine the M resources according to the N available resources after an interval of preset duration T.

The first preset condition is N≥a, N/S≥b, Q≥$Q_0$, a quantity c of conflicts of the first UE is greater than $C_0$, a conflict time w of the first UE is greater than $W_0$, or a service priority Q of the first UE or a priority of the UE is higher than $Q_0$, a is a resource threshold, b is a minimum proportion of available resources to preset resources, $C_0$ is a threshold of the quantity of conflicts, $W_0$ is a conflict time threshold, and $Q_0$ is a priority threshold, c is an integer greater than or equal to 0, and w is a positive number.

That the processor 1301 determines the M resources according to the N available resources after an interval of preset duration T includes randomly selecting the M resources from the N available resources, or obtaining L resources according to the N available resources, and randomly selecting, by the first UE, the M resources from the L available resources.

That the processor 1301 obtains L resources according to the N available resources specifically includes obtaining the L resources after performing an operation on the N available resources by using a preset rule.

The data sent by the transmitter 1303 to the at least one UE is new data obtained after original data is discarded, or is the original data.

The preset duration T may be determined in the following manner if the quantity c of conflicts of the first UE is greater than the threshold $C_0$, the conflict time w of the first UE is greater than the threshold $W_0$, or the service priority Q of the first UE or the priority of the UE is higher than the threshold $Q_0$, the preset duration T is 0, or T=$f(x)$, where x is one of N, N–S, N/S, the service priority Q of the first UE, the priority of the UE, a value customized by the first UE, c, w, or a function g(c, w) of c and w, and different values of x are corresponding to different function relationships represented by $f(x)$. For example, T=$f_1(N)$, T=$f_2(N/S)$, T=$f_3(N-S)$, T=$f_4(Q)$, T=$f_5(c)$, T=$f_6(w)$, or T=$f_7(c, w)$. A correspondence between a function and a value of x may be stipulated or predefined in a protocol. The present invention includes, but is not limited to, the following function relationship including a simple linear relationship T=ax+b, a modulo relationship T=x mod $N_t$, or a segmentation mapping relationship, where one value of x is corresponding to one value of T that is obtained by means of table lookup, and certainly, a parameter in the function, such as a, b, or $N_t$, is a predefined parameter.

The processor 1301 is specifically configured to send the data to the at least one second UE on the M resources.

The processor 1301 is further configured to determine a transmit probability P.

The transmitter 1303 is specifically configured to send the data to the at least one second UE on the M resources according to the transmit probability P.

The processor 1301 is configured to determine whether the first UE meets a second preset condition.

If the processor 1301 determines that the first UE meets the second preset condition, the sending unit sends the data to the at least one second UE on the M resources.

If the processor 1301 determines that the first UE does not meet the second preset condition, the processor 1301 determines a transmit probability P, and the transmitter 1303 sends the data to the at least one second UE on the M resources according to the transmit probability P. For example, if the first UE selects 10 resources from the determined available resources, and the determined transmit probability P is 0.5, the first UE sends the data on the 10 resources according to the probability 50%. From a perspective of statistics, a discovery signal is actually sent once in every two sending opportunities.

The second preset condition is N≥a, N/S≥b, Q≥$Q_0$, a quantity c of conflicts of the first UE is greater than $C_0$, a conflict time w of the first UE is greater than $W_0$, or a service priority Q of the first UE or a priority of the UE is higher than $Q_0$, a is a resource threshold, b is a minimum proportion of available resources to preset resources, $C_0$ is a threshold of the quantity of conflicts, $W_0$ is a conflict time threshold, and $Q_0$ is a priority threshold, c is an integer greater than or equal to 0, and w is a positive number.

The transmit probability P may be determined in the following manner. If the quantity c of conflicts of the first UE is greater than the threshold $C_0$, the conflict time w of the first UE is greater than the threshold $W_0$, or the service priority Q of the first UE or the priority of the UE is higher than the threshold $Q_0$, the transmit probability P is 1, or P=$f(x)$ where x is one of N, N–S, N/S, the service priority Q of the first UE, the priority of the UE, a value customized by the first UE, c, w, or a function g(c, w) of c and w, and different values of x are corresponding to different function relationships represented by $f(x)$.

It should be noted that S is a quantity of UEs in a first group corresponding to the first UE, and N is a quantity of UEs that are in the first group and that send data.

Alternatively, S is a quantity of neighboring UEs of the first UE, N is a quantity of UEs that are in the neighboring UEs of the first UE and that send data, and the neighboring UE of the first UE is UE that can directly communicate with the first UE.

In addition, the resource is at least one of a scheduling assignment SA resource, a service data resource, or a discovery resource, and the data sent to the at least one second UE is at least one of SA, service data, or a discovery signal.

Alternatively, the resource is at least one of a resource in an SA resource pool, a resource in a service data resource pool, or a resource in a discovery resource pool, or is a resource that is available for sending at least one of SA, service data, or a discovery signal in a period of time.

The UE provided in this embodiment of the present invention determines the N available resources from the S resources, determines the M resources according to the N available resources, and finally sends the data to the at least one second UE by using the M resources. According to an existing D2D technology, UE randomly selects a resource in a preset resource pool to transmit data, and a conflict is caused because different UEs preempt a same resource. Each UE detects a preset resource, determines an available resource, and then transmits data according to the determined available resource. This can reduce a probability that the UE competes for a same resource with another UE, and reduce, to some extent, a conflict generated in the D2D technology because transmit UE preempts a resource.

Embodiment 7

Figure 14:
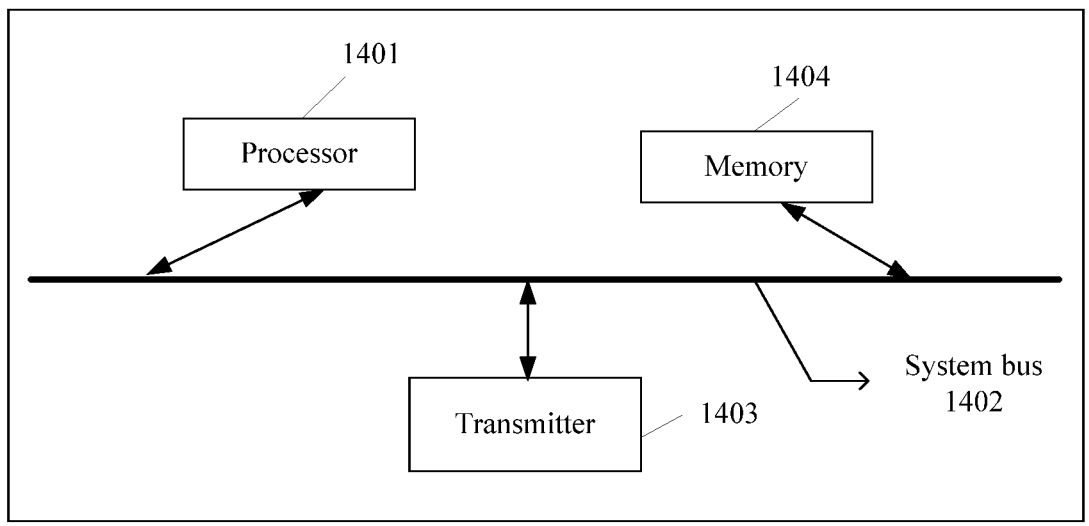
FIG. 14 is a structural block diagram of UE according to Embodiment 7 of the present invention.

This embodiment of the present invention provides UE 14. As shown in FIG. 14, the UE 14 includes a processor 1401, a system bus 1402, a transmitter 1403, and a memory 1404.

The processor 1401 may be a central processing unit (CPU).

The memory 1404 is configured to store program code, and transmit the program code to the processor 1401. The processor 1401 executes the following instruction according to the program code. The memory 1404 may include a volatile memory, for example, a random access memory (RAM). The memory 1404 may also include a non-volatile memory, for example, a read-only memory (ROM), a flash memory, a hard disk drive (HDD), or a solid state drive (SSD). The memory 1404 may further include a combination of the foregoing types of memories. The processor 1401, the memory 1404, and the transmitter 1403 are connected and communicate with each other by using the system bus 1402.

The transmitter 1403 may be implemented by an optical transceiver, an electrical transceiver, a wireless transceiver, or any combination thereof. For example, the optical transceiver may be a small form-factor pluggable (SFP) transceiver, an enhanced small form-factor pluggable (SFP+) transceiver, or a 10 gigabit small form-factor pluggable (XFP) transceiver. The electrical transceiver may be an Ethernet network interface controller (NIC). The wireless transceiver may be a wireless network interface controller (WNIC). The UE may have multiple transmitters 1403.

The processor 1401 is configured to obtain a preset parameter.

The transmitter 1403 is configured to send data to at least one second UE according to the preset parameter by using Z resources of S resources. S is a resource quantity indicated by resource configuration information obtained by the first UE.

The preset parameter is at least one of a quantity c of conflicts of the first UE, a conflict time w of the first UE, a service priority Q of the first UE, or a priority of the UE.

The processor 1401 is configured to randomly select the Z resources from the S resources.

The transmitter 1403 is configured to send the data to the at least one second UE by using the Z resources.

The processor 1401 is configured to obtain the resource configuration information. The resource configuration information includes information about the S resources.

The processor 1401 is configured to determine preset duration T according to the preset parameter, and randomly determine the Z resources from the S resources after an interval of the preset duration T.

The transmitter 1403 is configured to send the data to the at least one second UE on the Z resources.

It should be noted that the data sent by the sending unit 1403 to the at least one second UE on the Z resources is new data obtained after original data is discarded, or is the original data.

The processor 1401 is configured to determine whether the quantity c of conflicts of the first UE is less than a threshold $C_0$, whether the conflict time w of the first UE is less than a threshold $W_0$, or whether the service priority Q of the first UE or the priority of the UE is lower than a threshold $Q_0$.

The processor 1401 is configured to if the quantity c of conflicts of the first UE is less than the threshold $C_0$, the conflict time w of the first UE is less than the threshold $W_0$, or the service priority Q of the first UE or the priority of the UE is lower than the threshold $Q_0$, the processor 1401 determines preset duration T according to the preset parameter, and the transmitter 1403 randomly determines the Z resources from the S resources at an interval of the preset duration T. The transmitter 1403 is configured to send the data to the at least one second UE on the Z resources.

The transmitter 1403 is further configured to if the quantity c of conflicts of the first UE is not less than the threshold $C_0$, the conflict time w of the first UE is not less than the threshold $W_0$, or the service priority Q of the first UE or the priority of the UE is not lower than the threshold $Q_0$, send the data to the at least one second UE on the Z resources.

In specific implementation, the determining preset duration T according to the preset parameter includes when the quantity c of conflicts of the first UE is greater than the threshold $C_0$ or the conflict time w of the first UE is greater than the threshold $W_0$, determining that the preset duration T is 0, or determining that the preset duration T is $T=f(x)$, where x is one of N, N−S, N/S, the service priority Q of the first UE, a value customized by the first UE, c, w, or a function g(c, w) of c and w, and different values of x are corresponding to different function relationships represented by $f(x)$. For example, $T=f_1(N)$, $T=f_2(N/S)$, $T=f_3(N-S)$, $T=f_4(Q)$, $T=f_5(c)$, $T=f_6(w)$, or $T=f_7(c, w)$. A correspondence between a function and a value of x may be stipulated or predefined in a protocol. The present invention includes, but is not limited to, the following function relationship including a simple linear relationship $T=ax+b$, a modulo relationship $T=x \bmod N_t$, or a segmentation mapping relationship, where one value of x is corresponding to one value of T that is obtained by means of table lookup, and certainly, a parameter in the function, such as a, b, or $N_t$, is a predefined parameter.

The processor 1401 is configured to determine a transmit probability P according to the preset parameter.

The transmitter 1403 is configured to send the data to the at least one second UE on the Z resources according to the transmit probability P. For example, if the first UE selects 10 resources from the determined available resources, and the determined transmit probability P is 0.5, the first UE sends the data on the 10 resources according to the probability 50%. From a perspective of statistics, a discovery signal is actually sent once in every two sending opportunities.

The processor 1401 is configured to randomly determine the Z resources from the S resources.

The processor 1401 is configured to determine whether the quantity c of conflicts of the first UE is less than a threshold $C_0$, whether the conflict time w of the first UE is less than a threshold $W_0$, or whether the service priority Q of the first UE or the priority of the UE is lower than a threshold $Q_0$.

The processor 1401 is configured to if the quantity c of conflicts of the first UE is less than the threshold $C_0$, the conflict time w of the first UE is less than the threshold $W_0$, or the service priority Q of the first UE or the priority of the UE is lower than the threshold $Q_0$, determine a transmit probability P according to the preset parameter. The transmitter 1403 is configured to send the data to the at least one second UE on the Z resources according to the transmit probability P.

The transmitter 1403 is further configured to if the quantity c of conflicts of the first UE is not less than the threshold $C_0$, the conflict time w of the first UE is not less than the threshold $W_0$, or the service priority Q of the first UE or the priority of the UE is not lower than the threshold $Q_0$, send the data to the at least one second UE on the Z resources.

In specific implementation, the determining a transmit probability P according to the preset parameter includes when the quantity c of conflicts of the first UE is greater than the threshold $C_0$ or the conflict time w of the first UE is greater than the threshold $W_0$, determining that the transmit probability P is 1, or determining that the transmit probability P is $P=f(x)$, where x is one of N, N−S, N/S, the service priority Q of the first UE, a value customized by the first UE, c, w, or a function g(c, w) of c and w, and different values of x are corresponding to different function relationships represented by $f(x)$.

According to the UE provided in this embodiment of the present invention, the first UE sends the data to the at least one second UE according to the preset parameter by using the Z resources of the S resources. The preset parameter is at least one of the quantity c of conflicts of the first UE, the conflict time w of the first UE, the service priority Q of the first UE, or the priority of the UE. According to an existing D2D technology, UE randomly selects a resource in a preset resource pool to transmit data, and a conflict is caused because different UEs preempt a same resource. The UE determines the transmit probability or a wait period with reference to a parameter such as the quantity of conflicts of the UE, the conflict time of the UE, or the service priority of the UE. Different UEs are corresponding to different wait periods or transmit probabilities. This can avoid, to some extent, that the UE competes for a same resource with another UE, and effectively reduce a conflict generated in the D2D technology because transmit UE preempts a resource.

The foregoing descriptions about implementations allow a person skilled in the art to understand that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or part of the functions described above. For a detailed working process of the foregoing apparatus, refer to a corresponding process in the foregoing method embodiments. Details are not described herein again.

The units described as separate parts may or may not be physically separate, and parts displayed as units may be one or more physical units, may be located in one place, or may be distributed on different places. Some or all of the units may be selected according to actual requirements to achieve the objectives of the solutions of the embodiments. In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present invention essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   determining, by first user equipment (UE), N available resources from S resources available to the first UE, wherein S is a resource quantity indicated by resource configuration information obtained by the first UE, and wherein determining, by the first UE, N available resources from S resources available to the first UE comprises:
   detecting, by the first UE, energy or power of a signal carried on each of the S resources; and
   determining that a resource of the S resources is one of the N available resources based on one of the energy of the signal carried on the resource of the S resources being less than a threshold m, or based on the power of the signal carried on the resource of the S resources being less than a threshold n, wherein m and n are positive numbers;
   determining, by the first UE, M resources according to the N available resources; and
   sending, by the first UE, data to at least one second UE by using the M resources;
   wherein S is an integer greater than or equal to 1, wherein N is an integer greater than or equal to 0 and less than or equal to S, and wherein M is an integer greater than or equal to 0 and less than or equal to N.

2. The method according to claim 1, wherein the method further comprises obtaining the resource configuration information by the first UE before the determining the N available resources, wherein the resource configuration information comprises information about the S resources, and wherein the resource configuration information is one of preconfigured or configured by a base station.

3. The method according to claim 1, wherein the determining, by first UE, N available resources from S resources further comprises:
detecting, by the first UE, a sequence carried on each of the S resources, and if a particular resource of the S resources carries no preset sequence, determining that the particular resource is one of the N available resources.

4. The method according to claim 1, wherein the method further comprises performing, after the determining the N available resources from the S resources:
determining whether the first UE meets a first preset condition; and
performing at least one of:
determining, by the first UE, the M resources according to the N available resources in response to the first UE meeting the first preset condition; or
performing, in response to the first UE not meeting the first preset condition, and after an interval of duration T, determining, by the first UE, the M resources according to the N available resources.

5. The method according to claim 4, wherein the performing, in response to the first UE not meeting the first preset condition, and after the interval of duration T, the determining, by the first UE, the M resources according to the N available resources comprises redetermining N available resources from the S resources and determining the M resources according to the N available resources redetermined from the S resources;
wherein T is determined according to at least one of a quantity N of available resources, a quantity NS of unavailable resources, a proportion N/S of the available resources, a quantity c of conflicts of the first UE, a conflict time w, a service priority Q of the first UE, or a priority of the first UE; and
wherein the first preset condition is N≥a, N/S≥b, Q≥$Q_0$, wherein the quantity c of conflicts of the first UE is greater than $C_0$, wherein the conflict time w of the first UE is greater than $W_0$, or the service priority Q of the first UE or the priority of the UE is greater than $Q_0$, wherein a is a resource threshold, b is a minimum proportion of the available resources to preset resources, $C_0$ is a threshold of the quantity of conflicts, $W_0$ is a conflict time threshold, and $Q_0$ is a priority threshold, wherein c is an integer greater than or equal to 0, and wherein w is a positive number.

6. The method according to claim 1, wherein each resource of the S resources is at least one of a scheduling assignment (SA) resource, a service data resource, or a discovery resource, and the data sent to the at least one second UE is at least one of SA, service data, or a discovery signal.

7. A method, comprising:
obtaining, by first user equipment (UE), a preset parameter; and
sending, by the first UE, data to at least one second UE using Z resources of S resources available to the first UE and determined according to the preset parameter, wherein S is a resource quantity indicated by resource configuration information obtained by the first UE, wherein the sending the data to at least one second UE according to the preset parameter by using Z resources of S resources comprises:
determining, by the first UE, duration T according to the preset parameter;
randomly determining, by the first UE, the Z resources from the S resources after an interval of the duration T; and
sending the data to the at least one second UE on the Z resources;
wherein S is an integer greater than or equal to 1, and wherein Z is an integer less than or equal to S; and
wherein the preset parameter is associated with at least one of a value associated with one or more conflicts associated with the first UE, or a value associated with a priority associated with the first UE.

8. The method according to claim 7, wherein the method further comprises:
obtaining, by the first UE, the resource configuration information before the sending the data to the at least one second UE, wherein the resource configuration information comprises information about the S resources, and wherein the resource configuration information is one of configured by a base station or preconfigured.

9. The method according to claim 7, wherein the method further comprises performing, in response to meeting a first condition:
determining duration T according to the preset parameter; and
randomly determining the Z resources from the S resources at an interval of the duration T;
wherein the first condition comprises at least one of a quantity c of conflicts of the first UE being less than a threshold $C_0$, a conflict time w of the first UE being less than a threshold $W_0$, or a service priority Q of the first UE or a priority of the UE being lower than a threshold $Q_0$.

10. User equipment (UE), comprising:
a processor; and
a non-transitory computer-readable storage medium storing a program to be executed by the processor, the program including instructions to:
determine, by first user equipment (UE), N available resources from S resources available to the first UE, wherein S is a resource quantity indicated by resource configuration information obtained by the first UE, and wherein the instructions to determine, by the first UE, N available resources from S resources available to the first UE comprise instructions to:
detect, by the first UE, energy or power of a signal carried on each of the S resources; and
determine that a resource of the S resources is one of the N available resources based on one of the energy of the signal carried on the resource of the S resources being less than a threshold m, or based on the power of the signal carried on the resource of the S resources being less than a threshold n, wherein m and n are positive numbers;
determine M resources according to the N available resources; and
send data to at least one second UE by using the M resources; wherein S is an integer greater than or equal to 1, wherein N is an integer greater than or equal to 0 and less than or equal to S, and wherein M is an integer greater than or equal to 0 and less than or equal to N.

11. The UE according to claim 10, the program further comprising instructions to:

obtain the resource configuration information, wherein the resource configuration information comprises information about the S resources, and wherein the resource configuration information is one of preconfigured or configured by a base station.

12. The UE according to claim 10, wherein the instructions to determine the N available resources further comprise instructions to:
   detect a sequence carried on each of the S resources, and determine a particular resource of the S resources is one of the N available resources if the particular resource carries no preset sequence.

13. The UE according to claim 10, wherein the program further includes instructions to perform, after determining the N available resources from the S resources:
   determine whether the UE meets a first preset condition; and
   perform at least one of:
      determine the M resources according to the N available resources in response to the UE meeting the first preset condition; or
      perform, in response to the UE not meeting the first preset condition, and after an interval of duration T, determining, by the UE, the M resources according to the N available resources.

14. The UE according to claim 13, wherein the instructions to perform, in response to the UE not meeting the first preset condition, and after the interval of duration T, the determining, by the UE, the M resources according to the N available resources include instructions to redetermine N available resources from the S resources and determine the M resources according to the N available resources redetermined from the S resources;
   wherein T is determined according to at least one of a quantity N of available resources, a quantity NS of unavailable resources, a proportion N/S of the available resources, a quantity c of conflicts of the first UE, a conflict time w, a service priority Q of the first UE, or a priority of the first UE; and
   wherein the first preset condition is $N \geq a$, $N/S \geq b$, $Q \geq Q_0$, wherein the quantity c of conflicts of the first UE is greater than $C_0$, wherein the conflict time w of the first UE is greater than $W_0$, or the service priority Q of the first UE or the priority of the UE is greater than $Q_0$, wherein a is a resource threshold, b is a minimum proportion of the available resources to preset resources, $C_0$ is a threshold of the quantity of conflicts, $W_0$ is a conflict time threshold, and $Q_0$ is a priority threshold, wherein c is an integer greater than or equal to 0, and wherein w is a positive number.

15. The UE according to claim 10, wherein each resource of the S resources is at least one of a scheduling assignment (SA) resource, a service data resource, or a discovery resource, and the data sent to the at least one second UE is at least one of SA, service data, or a discovery signal.

16. First user equipment (UE), comprising:
   a processor; and
   a non-transitory computer-readable storage medium storing a program to be executed by the processor, the program including instructions to:
   obtain a preset parameter; and
   send data to at least one second UE using Z resources of S resources available to the first UE and determined according to the preset parameter, and wherein S is a resource quantity indicated by resource configuration information obtained by the first UE, wherein the instructions to send data to at least one second UE using Z resources comprise instructions to:
      determine duration T according to the preset parameter;
      randomly determine the Z resources from the S resources after an interval of the duration T; and
      send the data to the at least one second UE on the Z resources;
   wherein S is an integer greater than or equal to 1, and wherein Z is an integer less than or equal to S; and
   wherein the preset parameter is associated with at least one of a value associated with one or more conflicts associated with the first UE, or a value associated with a priority associated with the first UE.

17. The first UE according to claim 16, wherein the program further includes instructions to
   obtain the resource configuration information, wherein the resource configuration information comprises information about the S resources, and wherein the resource configuration information is configured by a base station or preconfigured.

18. The first UE according to claim 16, wherein the program further includes instructions to perform, in response to meeting a first condition:
   determine duration T according to the preset parameter; and
   randomly determine the Z resources from the S resources at an interval of the duration T;
   wherein the first condition comprises at least one of a quantity c of conflicts of the first UE being less than a threshold $C_0$, a conflict time w of the first UE being less than a threshold $W_0$, or a service priority Q of the UE or a priority of the UE being lower than a threshold $Q_0$.

* * * * *